United States Patent
Sybesma et al.

(10) Patent No.: US 9,497,098 B2
(45) Date of Patent: Nov. 15, 2016

(54) EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL

(75) Inventors: Eric W. Sybesma, Minneapolis, MN (US); Jeffrey J. Miller, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 13/426,764

(22) Filed: Mar. 22, 2012

(65) Prior Publication Data

US 2012/0243554 A1 Sep. 27, 2012

Related U.S. Application Data

(60) Provisional application No. 61/467,743, filed on Mar. 25, 2011.

(51) Int. Cl.
*H04L 12/26* (2006.01)
*H04L 12/24* (2006.01)

(52) U.S. Cl.
CPC .............. *H04L 43/12* (2013.01); *H04L 41/06* (2013.01)

(58) Field of Classification Search
CPC .............. E02F 3/3659; H01R 13/665; H01R 13/6658; H04L 67/16; H04L 41/12;
(Continued)

(56) References Cited

U.S. PATENT DOCUMENTS 5,052,940 A  10/1991  Bengal
5,161,988 A  11/1992  Krupka
(Continued)

FOREIGN PATENT DOCUMENTS

CN  101833151  9/2010
EP  1569494  8/2005
(Continued)

OTHER PUBLICATIONS

Vukmirovic et al. "Software architecture for Smart Metering systems with Virtual Power Plant", IEEE, MELECON 2010-2010 15th IEEE Mediterranean Electrotechnical Conference, Apr. 26-28, 2010, pp. 448-451, Valetta.*
(Continued)

*Primary Examiner* — Pao Sinkantarakorn
*Assistant Examiner* — Michael Phillips
(74) *Attorney, Agent, or Firm* — Fogg & Powers LLC

(57) ABSTRACT

One exemplary embodiment is directed to a system comprising a plurality of connector assemblies. Each of the connector assemblies is configured to read information stored on or in physical communication media that is connected to the ports of the respective connector assembly. The system further comprises an aggregation point communicatively coupled to the plurality of connector assemblies. The aggregation point is configured to automatically discover the connector assemblies and cause each of the connector assemblies to send to the aggregation point at least some of the information read from the physical communication media that is connected to the ports of the respective connector assemblies. The aggregation point is configured to store at least some of the information sent by the connector assemblies to the aggregation point. A reliable packet-based communication protocol is used by the aggregation point to monitor events occurring at at least one connector assembly.

5 Claims, 7 Drawing Sheets

(58) Field of Classification Search
CPC ............... H04L 41/06; H04L 43/12; H04L 43/0811; H04L 12/24; H04L 12/26; H04Q 11/0457; H04Q 1/136; G02B 6/3895; G06F 11/30; G06F 11/3495; H04M 10/425; G01R 31/021
USPC ........ 370/232, 233, 234, 242, 464; 709/203, 709/230; 725/148
See application file for complete search history.

(56) References Cited

U.S. PATENT DOCUMENTS

| | | | |
|---|---|---|---|
| 5,195,902 A | 3/1993 | Bengal | |
| 5,280,251 A | 1/1994 | Strangio | |
| 5,386,567 A | 1/1995 | Lien et al. | |
| 5,394,503 A | 2/1995 | Dietz, Jr. et al. | |
| 5,418,334 A | 5/1995 | Williams | |
| 5,420,512 A | 5/1995 | Spillane et al. | |
| 5,448,675 A | 9/1995 | Leone et al. | |
| 5,461,693 A | 10/1995 | Pimpinella | |
| 5,463,706 A | 10/1995 | Dumont et al. | |
| 5,473,715 A | 12/1995 | Schofield et al. | |
| 5,483,467 A | 1/1996 | Krupka | |
| 5,487,666 A | 1/1996 | DiGiovanni | |
| 5,541,586 A | 7/1996 | Wise | |
| 5,550,755 A | 8/1996 | Martin et al. | |
| 5,606,664 A | 2/1997 | Brown et al. | |
| 5,619,496 A | 4/1997 | Weir | |
| 5,764,043 A | 6/1998 | Czosnowski et al. | |
| 5,832,071 A | 11/1998 | Voelker | |
| 5,854,824 A | 12/1998 | Bengal et al. | |
| 5,876,240 A | 3/1999 | Derstine et al. | |
| 5,886,531 A | 3/1999 | Delcourt et al. | |
| 6,002,331 A | 12/1999 | Laor | |
| 6,115,393 A * | 9/2000 | Engel et al. | .......... 370/469 |
| 6,222,908 B1 | 4/2001 | Bartolutti et al. | |
| 6,234,830 B1 | 5/2001 | Ensz et al. | |
| 6,238,235 B1 | 5/2001 | Shavit et al. | |
| 6,243,510 B1 | 6/2001 | Rauch | |
| 6,285,293 B1 | 9/2001 | German et al. | |
| 6,300,877 B1 | 10/2001 | Schannach et al. | |
| 6,330,307 B1 | 12/2001 | Bloch et al. | |
| 6,350,148 B1 | 2/2002 | Bartolutti et al. | |
| 6,359,859 B1 | 3/2002 | Brolin et al. | |
| 6,421,337 B1 * | 7/2002 | Rao et al. | .......... 370/351 |
| 6,424,710 B1 | 7/2002 | Bartolutti et al. | |
| 6,499,861 B1 | 12/2002 | German et al. | |
| 6,522,737 B1 | 2/2003 | Bartolutti et al. | |
| 6,574,586 B1 | 6/2003 | David et al. | |
| 6,577,243 B1 | 6/2003 | Dannenmann et al. | |
| 6,577,595 B1 | 6/2003 | Counterman | |
| 6,636,152 B2 | 10/2003 | Schannach et al. | |
| 6,684,179 B1 | 1/2004 | David | |
| 6,701,192 B1 | 3/2004 | Herwig | |
| 6,725,177 B2 | 4/2004 | David et al. | |
| 6,862,609 B2 | 3/2005 | Merkey | |
| D510,068 S | 9/2005 | Haggay et al. | |
| 6,961,675 B2 | 11/2005 | David | |
| 6,968,994 B1 | 11/2005 | Ashwood Smith | |
| 6,976,867 B2 | 12/2005 | Navarro et al. | |
| 6,983,095 B2 | 1/2006 | Reagan et al. | |
| 7,000,042 B1 | 2/2006 | Burns et al. | |
| 7,038,135 B1 | 5/2006 | Chan et al. | |
| 7,042,562 B2 | 5/2006 | Kiani et al. | |
| 7,077,710 B2 | 7/2006 | Haggay et al. | |
| 7,081,808 B2 | 7/2006 | Colombo et al. | |
| 7,123,810 B2 | 10/2006 | Parrish | |
| 7,143,227 B2 | 11/2006 | Maine | |
| 7,153,142 B2 | 12/2006 | Shifris et al. | |
| 7,160,143 B2 | 1/2007 | David et al. | |
| 7,193,422 B2 | 3/2007 | Velleca et al. | |
| 7,226,217 B1 | 6/2007 | Benton et al. | |
| 7,229,020 B2 | 6/2007 | Goodison et al. | |
| 7,234,944 B2 | 6/2007 | Nordin et al. | |
| 7,289,334 B2 | 10/2007 | Behrens et al. | |
| 7,297,018 B2 | 11/2007 | Caveney et al. | |
| 7,312,715 B2 | 12/2007 | Shalts et al. | |
| D559,186 S | 1/2008 | Kelmer | |
| 7,315,224 B2 | 1/2008 | Gurovich et al. | |
| D564,966 S | 3/2008 | Shifris | |
| 7,352,289 B1 | 4/2008 | Harris | |
| 7,377,819 B1 | 5/2008 | Cooper et al. | |
| 7,401,985 B2 | 7/2008 | Aronson et al. | |
| D575,743 S | 8/2008 | Shifris et al. | |
| 7,411,405 B2 | 8/2008 | Nordin | |
| 7,445,389 B2 | 11/2008 | Aronson | |
| 7,455,527 B2 | 11/2008 | Nordin et al. | |
| 7,468,669 B1 | 12/2008 | Beck et al. | |
| 7,479,032 B2 | 1/2009 | Hoath et al. | |
| 7,499,616 B2 | 3/2009 | Aronson et al. | |
| 7,517,243 B2 | 4/2009 | Caveney et al. | |
| 7,540,667 B2 | 6/2009 | Murano | |
| 7,551,456 B2 | 6/2009 | Behrens et al. | |
| 7,564,795 B2 | 7/2009 | Stephenson et al. | |
| 7,587,590 B2 | 9/2009 | Yamada et al. | |
| 7,684,416 B2 | 3/2010 | Galin et al. | |
| 7,804,700 B2 | 9/2010 | Yamada et al. | |
| 7,811,119 B2 | 10/2010 | Caveney et al. | |
| 7,881,675 B1 * | 2/2011 | Gazdzinski | ............ 455/74.1 |
| 7,979,613 B2 | 7/2011 | Zohar et al. | |
| 8,027,364 B2 | 9/2011 | Becattini et al. | |
| 8,346,919 B1 * | 1/2013 | Eiriksson et al. | ............ 709/224 |
| 8,578,067 B2 | 11/2013 | Diab | |
| 2001/0043573 A1 | 11/2001 | Kelly | |
| 2002/0071394 A1 | 6/2002 | Koziy et al. | |
| 2002/0191602 A1 | 12/2002 | Woodring et al. | |
| 2002/0194426 A1 | 12/2002 | Obara et al. | |
| 2003/0037132 A1 | 2/2003 | Abdollahi et al. | |
| 2003/0046233 A1 | 3/2003 | Ip | |
| 2003/0097481 A1 | 5/2003 | Richter | |
| 2003/0112802 A1 | 6/2003 | Ono et al. | |
| 2003/0120915 A1 | 6/2003 | Kleinsteiber et al. | |
| 2005/0030955 A1 | 2/2005 | Galin et al. | |
| 2005/0097243 A1 | 5/2005 | Yamashita et al. | |
| 2005/0114473 A1 | 5/2005 | Guy et al. | |
| 2005/0164548 A1 | 7/2005 | Spears et al. | |
| 2005/0186819 A1 | 8/2005 | Velleca et al. | |
| 2005/0190768 A1 | 9/2005 | Cutler | |
| 2005/0207399 A1 * | 9/2005 | Spitzer | .......... 370/352 |
| 2006/0050630 A1 | 3/2006 | Kobayashi et al. | |
| 2006/0059293 A1 | 3/2006 | Wurzburg et al. | |
| 2006/0123119 A1 * | 6/2006 | Hill et al. | .......... 709/227 |
| 2006/0160395 A1 | 7/2006 | Macauley et al. | |
| 2006/0160396 A1 | 7/2006 | Macauley et al. | |
| 2006/0179144 A1 | 8/2006 | Nagase | |
| 2006/0203715 A1 | 9/2006 | Hunter et al. | |
| 2006/0220533 A1 | 10/2006 | Achiwa et al. | |
| 2006/0227759 A1 | 10/2006 | Bohm et al. | |
| 2006/0268507 A1 | 11/2006 | Takahashi | |
| 2007/0025306 A1 | 2/2007 | Cox et al. | |
| 2007/0042637 A1 | 2/2007 | Bell et al. | |
| 2007/0058338 A1 | 3/2007 | Lee | |
| 2007/0115850 A1 * | 5/2007 | Tsuchiya et al. | .......... 370/252 |
| 2007/0117444 A1 | 5/2007 | Caveney et al. | |
| 2007/0162954 A1 | 7/2007 | Pela | |
| 2007/0230452 A1 | 10/2007 | Hough et al. | |
| 2007/0238343 A1 * | 10/2007 | Velleca et al. | .......... 439/188 |
| 2007/0245033 A1 | 10/2007 | Gavrilescu et al. | |
| 2007/0264971 A1 * | 11/2007 | Blankenship | .......... H04L 45/00 455/406 |
| 2007/0274234 A1 | 11/2007 | Kubota | |
| 2008/0013457 A1 | 1/2008 | Berman et al. | |
| 2008/0031260 A1 * | 2/2008 | Polland | .......... H04L 12/4645 370/395.53 |
| 2008/0077656 A1 * | 3/2008 | Broda | .......... 709/203 |
| 2008/0133986 A1 | 6/2008 | Vainsencher et al. | |
| 2008/0162742 A1 * | 7/2008 | Kong et al. | .......... 710/19 |
| 2008/0225853 A1 | 9/2008 | Melman et al. | |
| 2008/0239944 A1 * | 10/2008 | Golla et al. | .......... 370/216 |
| 2009/0136293 A1 * | 5/2009 | Normann | .......... 403/345 |
| 2010/0049822 A1 | 2/2010 | Davies et al. | |
| 2010/0064183 A1 * | 3/2010 | Buia | .......... H04L 41/0604 714/57 |
| 2010/0091790 A1 | 4/2010 | Wasielewski, Jr. et al. | |

(56) References Cited

U.S. PATENT DOCUMENTS

| | | | |
|---|---|---|---|
| 2010/0110932 A1* | 5/2010 | Doran | H04L 41/22 370/254 |
| 2010/0127758 A1 | 5/2010 | Hollis | |
| 2010/0138363 A1* | 6/2010 | Batterberry | G06Q 10/04 705/412 |
| 2010/0150005 A1* | 6/2010 | Gerber et al. | 370/252 |
| 2010/0211664 A1* | 8/2010 | Raza | H01R 13/6658 709/223 |
| 2010/0211665 A1 | 8/2010 | Raza | |
| 2010/0211697 A1 | 8/2010 | Raza | |
| 2010/0215049 A1 | 8/2010 | Raza | |
| 2010/0241748 A1 | 9/2010 | Ansari et al. | |
| 2010/0302754 A1 | 12/2010 | Nordin et al. | |
| 2010/0315942 A1* | 12/2010 | Jackson et al. | 370/216 |
| 2011/0113136 A1* | 5/2011 | Phaal | G06F 11/3476 709/224 |
| 2011/0219147 A1 | 9/2011 | Diab | |
| 2012/0051490 A1 | 3/2012 | Hussain et al. | |
| 2012/0133524 A1 | 5/2012 | Anderson et al. | |
| 2012/0185185 A1 | 7/2012 | Bae et al. | |
| 2012/0246347 A1 | 9/2012 | Sybesma et al. | |
| 2012/0246351 A1 | 9/2012 | Sybesma et al. | |
| 2012/0246362 A1 | 9/2012 | Anne et al. | |
| 2012/0246523 A1 | 9/2012 | Anne et al. | |

FOREIGN PATENT DOCUMENTS

| | | |
|---|---|---|
| JP | 11162570 | 6/1999 |
| JP | 2001297044 | 10/2001 |
| KR | 102008017170 | 2/2008 |
| WO | 2010093987 | 8/2010 |

OTHER PUBLICATIONS

"IntelliMAC", May 2003, pp. 16, Publisher: Nordx/CDT.

Kang et al., "Design and Implementation of Network Management System for Power Line Communication Network", "IEEE International Symposium on Power Line Communications and its Applications (ISPLC 2007)", Mar. 28, 2007, pp. 23-28, Publisher: IEEE.

Meredith, "Managers Missing Point of Intelligent Patching ", "http://searchdatacentertechtarget.com/news/article/0,289142,sid80_gci1099991,00.html", Jun. 21, 2005, pp. 1-2, Publisher: SearchDataCenter.com.

Milligan, "Intelligent Patching Systems Carving Out a 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.

Feltgen, "PCT Patent Application PCT/EP2009/009036: Method and Arrangement for Identifying at Least One Object", Dec. 16, 2009, pp. 1-25, Published in: WO.

Jacobson et al., "TCP Extensions for High Performance", May 1992, pp. 1-38.

Braden, "Extending TCP for Transactions—Concepts", Nov. 1992, pp. 1-39.

Bellovin, "Defending Against Sequence Number Attacks", May 1996, pp. 1-7.

Mathis et al., "TCP Selective Acknowledgment Options", Oct. 1996, pp. 1-13.

Paxson, "Computing TCP's Retransmission Timer", Nov. 2000, pp. 1-9.

Duke et al., "A Roadmap for Transmission Control Protocol (TCP) Specification Documents", Sep. 2006, pp. 1-34.

Allman et al., "TCP Congestion Control", Sep. 2009, pp. 1-19.

Cerf et al., "Specification of Internet Transmission Control Program", Dec. 1974, pp. 1-71.

"Transmission Control Protocol", Sep. 1981, pp. 1-92, Publisher: Information Sciences Institute.

Reynolds et al., "Assigned Numbers", Jun. 1984, pp. 1-44.

International Searching Authority, International Search Report, from Foreign Counterpart of U.S. Appl. No. 13/426,764, Sep. 28, 2012, pp. 1-11, Published in: WO.

U.S. Patent and Trademark Office, Office Action, from U.S. Appl. No. 13/426,821, Oct. 25, 2013, pp. 1-66, Published in: US.

U.S. Patent and Trademark Office, Office Action, from U.S. Appl. No. 13/426,794, Nov. 7, 2013, pp. 1-44, Published in: US.

U.S. Patent and Trademark Office, Office Action, from U.S. Appl. No. 13/426,777, Oct. 23, 2013, pp. 1-71, Published in: US.

U.S. Patent and Trademark Office, Office Action, from U.S. Appl. No. 13/426,821, Apr. 8, 2014, pp. 1-63, Published in: US.

The International Bureau of WIPO, International Preliminary Report on Patentability from PCT Application No. PCT/US2012/030067 mailed Oct. 10, 2013, from PCT Counterpart of U.S. Appl. No. 13/426,821, Oct. 10, 2013, pp. 1-6, Published in: WO.

Korean Intellectual Property Office, International Search Report and Written Opinion from PCT Application No. PCT/US2012/030067 mailed Oct. 23, 2012, from Foreign Counterpart of U.S. Appl. No. 13/426,821, Oct. 23, 2012, pp. 1-12, Published in: WO.

U.S. Patent and Trademark Office, Notice of Allowance, from U.S. Appl. No. 13/426,805, Apr. 29, 2014, pp. 1-24, Published in: US.

U.S. Patent and Trademark Office, Office Action , from U.S. Appl. No. 13/426,805, Jan. 2, 2014, pp. 1-22, Published in: US.

Korean Intellectual Property Office, International Search Report and Written Opinion from PCT Application No. PCT/US2012/030065 mailed Sep. 28, 2012, from Foreign Counterpart of U.S. Appl. No. 13/426,805, Sep. 28, 2012, pp. 1-9, Published in: WO.

U.S. Patent and Trademark Office, Final Office Action, from U.S. Appl. No. 13/426,794, Apr. 22, 2014, pp. 1-61, Published in: US.

The International Bureau of WIPO, International Preliminary Report on Patentability from PCT Application No. PCT/US2012/030064 mailed Oct. 10, 2013, from PCT Counterpart of U.S. Appl. No. 13/426,794, Oct. 10, 2013, pp. 1-6, Published in: WO.

U.S. Patent and Trademark Office, Office Action, from U.S. Appl. No. 13/426,777, Apr. 8, 2014, pp. 1-65, Published in: US.

Korean Intellectual Property Office, International Search Report and Written Opinion from PCT Application No. PCT/US2012/030063 mailed Oct. 29, 2012, from Foreign Counterpart of U.S. Application No. 13/426,777, Oct. 29, 2012, pp. 1-12, Published in: WO.

The International Bureau of WIPO, International Preliminary Report on Patentability from PCT Application No. PCT/US2012/030062 mailed Oct. 10, 2013, from PCT Counterpart of U.S. Appl. No. 13/426,764, Oct. 10, 2013, pp. 1-6, Published in: WO.

U.S. Patent and Trademark Office, Notice of Allowance and Fee(s) Due, U.S. Appl. No. 13/426,821, Nov. 19, 2014, pp. 1-8.

U.S. Patent and Trademark Office, Final Office Action, Dec. 31, 2014, pp. 1-19, Published in: US, U.S. Appl. No. 13/426,794.

United States Patent and Trademark Office, Final Office Action, U.S. Appl. No. 13/426,821, Sep. 10, 2014, pp. 1-50.

European Patent Office, Extended European Search Report from EP Application No. 12763509.2 mailed Jul. 24, 2014, from Foreign Counterpart of U.S. Appl. No. 13/426,794, Jul. 24, 2014, pp. 1-5, Published in: EP.

U.S. Patent and Trademark Office, Advisory Action, from U.S. Appl. No. 13/426,794, Jul. 11, 2014, pp. 1-3, Published in: US.

United States Patent and Trademark Office, Office Action, U.S. Appl. No. 13/426,794, Aug. 28, 2014, pp. 1-18.

United States Patent and Trademark Office, Final Office Action, U.S. Appl. No. 13/426,777, Sep. 9, 2014, pp. 1-51.

European Patent Office, Communication under Rule 71(3) from Application Serial No. 12763509.2, from Foreign Counterpart to U.S. Appl. No. 13/426,794, Apr. 8, 2015, pp. 1-61, Published in: EP.

U.S. Patent and Trademark Office, Notice of Alloawnce and Fee(s) Due, U.S. Appl. No. 13/426,794, Mar. 10, 2015, pp. 1-9.

Australian Patent Office, Office Action for AU Application No. 2012237675, from Foreign Counterpart to U.S. Appl. No. 13/426,794, Oct. 8, 2015, pp. 1-3.

Chinese Patent Office, First Office Action for Chinese Application No. 201280025290.4, from Foreign Counterpart to U.S. Appl. No. 13/426,794, Jun. 30, 2015, pp. 1-13, Published in: CN.

(56) References Cited

OTHER PUBLICATIONS

China Patent Office, Second Office Action for CN Application No. CN 201280025290A, from Foreign counterpart to U.S. Appl. No. 13/426,794, Mar. 10, 2016, pp. 1-15, Published in: CN.

* cited by examiner

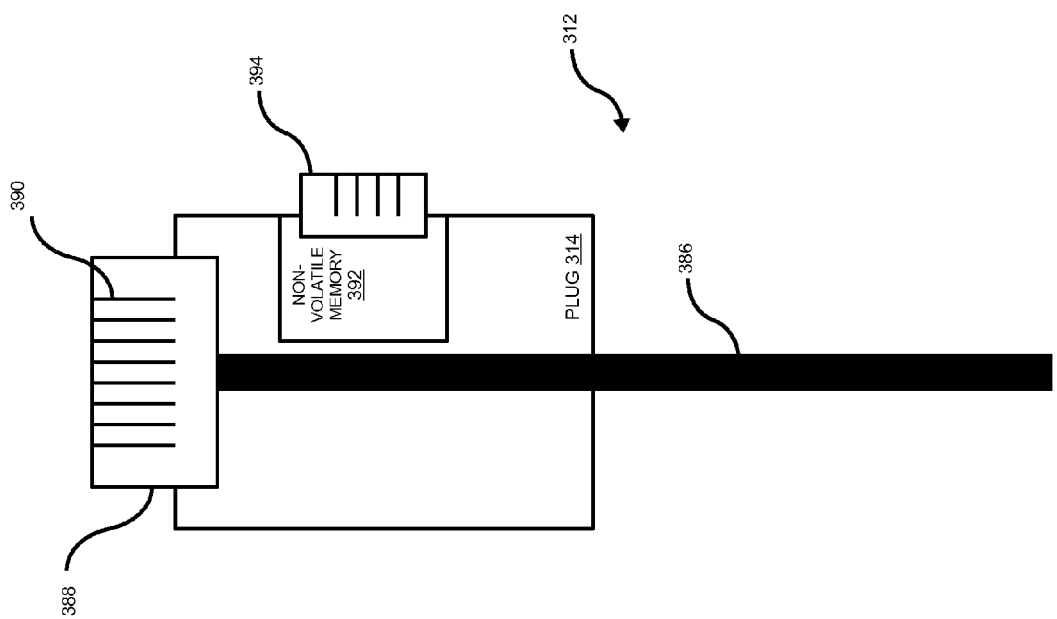

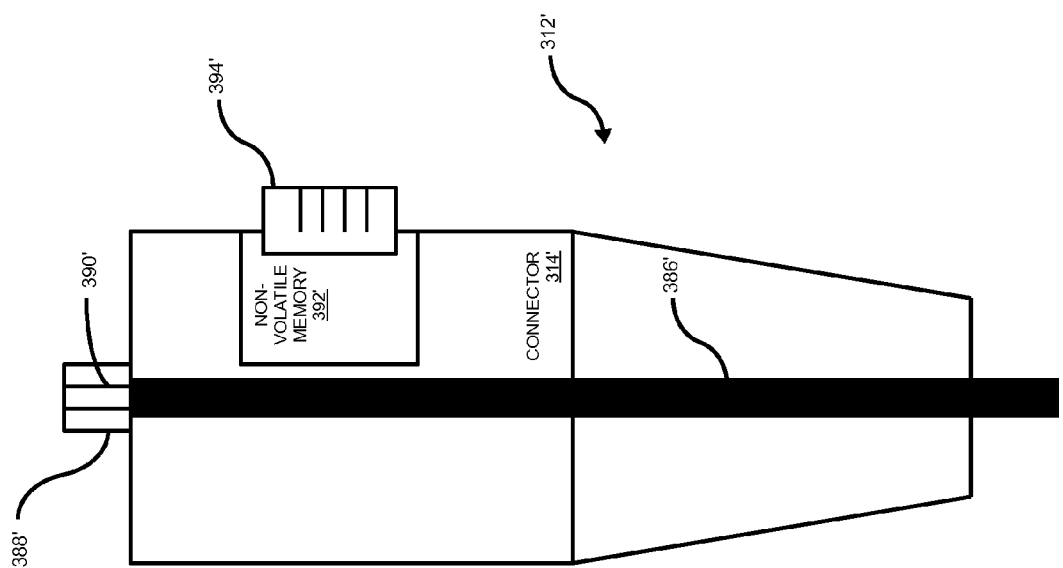

EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL

CROSS-REFERENCE TO RELATED APPLICATIONS

This application claims the benefit of U.S. Provisional Patent Application Ser. No. 61/467,743, filed on Mar. 25, 2011, which is hereby incorporated herein by reference.

This application is related to the following:

U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM", which is hereby incorporated herein by reference;

U.S. patent application Ser. No. 13/426,821, filed on even date herewith, titled "DOUBLE-BUFFER INSERTION COUNT STORED IN A DEVICE ATTACHED TO A PHYSICAL LAYER MEDIUM", which is hereby incorporated herein by reference;

U.S. Provisional Patent Application Ser. No. 61/467,725, filed on Mar. 25, 2011, titled "DYNAMICALLY DETECTING A DEFECTIVE CONNECTOR AT A PORT", which is hereby incorporated herein by reference;

U.S. patent application Ser. No. 13/426,805, filed on even date herewith, titled "DYNAMICALLY DETECTING A DEFECTIVE CONNECTOR AT A PORT", which is hereby incorporated herein by reference;

U.S. Provisional Patent Application Ser. No. 61/467,729, filed on Mar. 25, 2011, titled "IDENTIFIER ENCODING SCHEME FOR USE WITH MULTI-PATH CONNECTORS", which is hereby incorporated herein by reference;

U.S. patent application Ser. No. 13/426,794, filed on even date herewith, titled "IDENTIFIER ENCODING SCHEME FOR USE WITH MULTI-PATH CONNECTORS", which is hereby incorporated herein by reference;

U.S. Provisional Patent Application Ser. No. 61/467,736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS", which is hereby incorporated herein by reference; and U.S. patent application Ser. No. 13/426,777, filed on even date herewith, titled "SYSTEMS AND METHODS FOR UTILIZING VARIABLE LENGTH DATA FIELD STORAGE SCHEMES ON PHYSICAL COMMUNICATION MEDIA SEGMENTS", which is hereby incorporated herein by reference.

BACKGROUND

Communication networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

A network or enterprise management system (generally referred to here as a "network management system" or "NMS") is typically aware of the logical communication links that exist in a network but typically does not have information about the specific physical layer media that are used to implement the logical communication links. Indeed, NMS systems typically do not have the ability to display or otherwise provide information about how logical communication links are implemented at the physical layer level.

Physical layer management (PLM) systems do exist. However, existing PLM systems are typically designed to facilitate the adding, changing, and removing of cross connections at a particular patch panel or a set of patch panels at a given location. Generally, such PLM systems include functionality to track what is connected to each port of a patch panel, trace connections that are made using a patch panel, and provide visual indications to a user at a patch panel. However, such PLM systems are typically "patch-panel" centric in that they are focused on helping a technician correctly add, change, or remove cross connections at a patch panel. Any "intelligence" included in or coupled to the patch panel is typically only designed to facilitate making accurate cross connections at the patch panel and troubleshooting related problems (for example, by detecting whether a patch cord is inserted into a given port and/or by determining which ports are coupled to one another using a patch cord).

Moreover, any information that such PLM systems collect is typically only used within the PLM systems. In other words, the collections of information that such PLM systems maintain are logical "islands" that are not used at the application-layer level by other systems. Though such PLM systems are sometimes connected to other networks (for example, connected to local area networks or the Internet), such network connections are typically only used to enable a user to remotely access the PLM systems. That is, a user remotely accesses the PLM-related application-layer functionality that resides in the PLM system itself using the external network connection but external systems or networks typically do not themselves include any application-layer functionality that makes use of any of the physical-layer-related information that resides in the PLM system.

SUMMARY

One exemplary embodiment is directed to a system comprising a plurality of connector assemblies. Each of the connector assemblies is configured to read information stored on or in physical communication media that is connected to the ports of the respective connector assembly. The system further comprises an aggregation point communicatively coupled to the plurality of connector assemblies. The aggregation point is configured to automatically discover the connector assemblies and cause each of the connector assemblies to send to the aggregation point at least some of the information read from the physical communication media that is connected to the ports of the respective connector assemblies. The aggregation point is configured to store at least some of the information sent by the connector assemblies to the aggregation point. A reliable packet-based communication protocol is used by the aggregation point to monitor events occurring at at least one connector assembly.

DRAWINGS

FIGS. 3A-3B are diagrams illustrating exemplary embodiments of patch cords.

Like reference numbers in the various figures indicate like elements.

DETAILED DESCRIPTION

Figure 1:
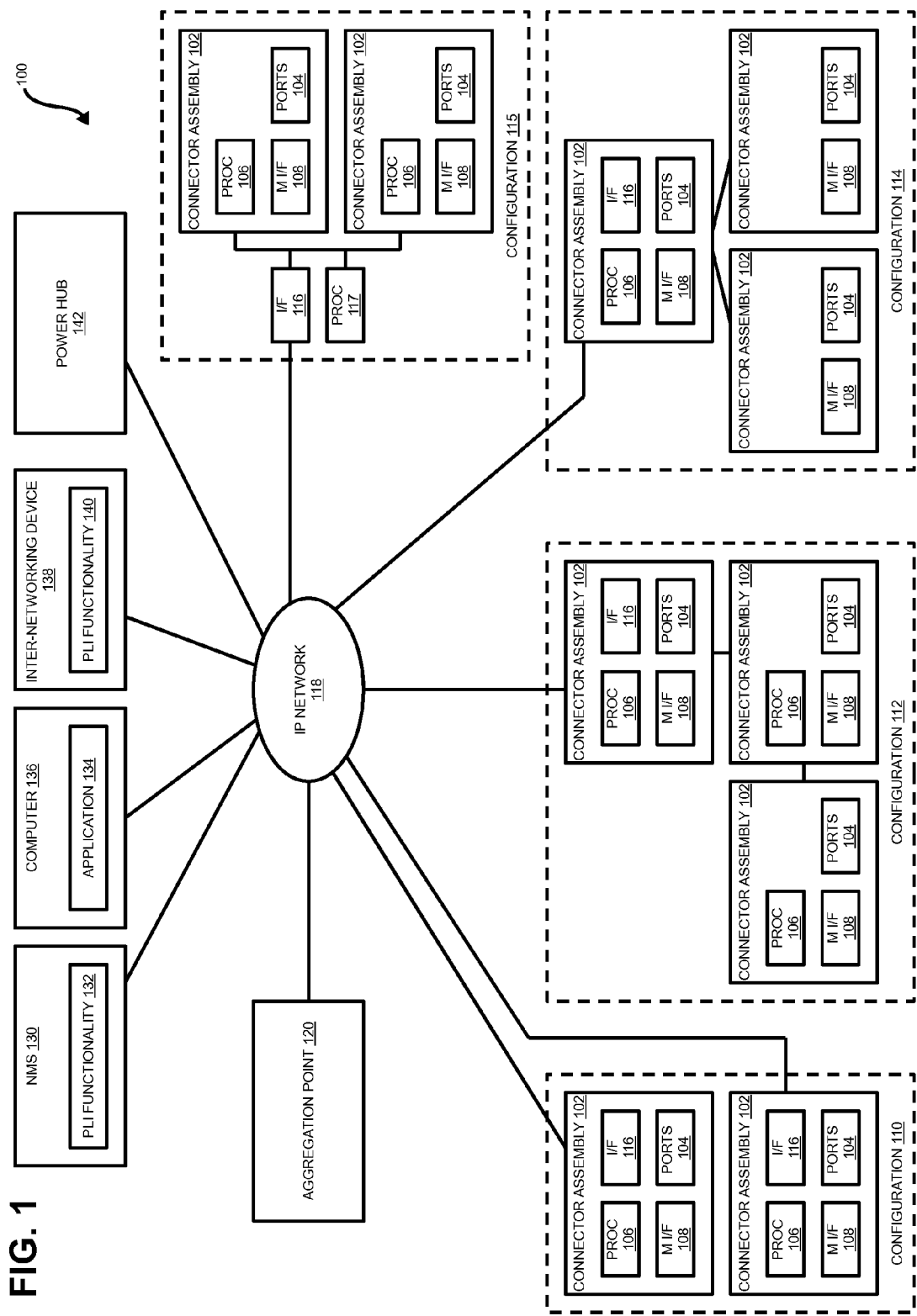
FIG. 1 is a block diagram of one exemplary embodiment of a system that includes physical layer information (PLI) functionality as well as physical layer management (PLM) functionality.

FIG. 1 is a block diagram of one embodiment of a system 100 that includes physical layer information (PLI) functionality as well as physical layer management (PLM) functionality. The system 100 comprises a plurality of connector assemblies 102, where each connector assembly 102 comprises one or more ports 104. In general, the connector assemblies 102 are used to attach segments of physical communication media to one another.

Each segment of physical communication media is attached to a respective port 104. Each port 104 is used to connect two or more segments of physical communication media to one another (for example, to implement a portion of a logical communication link). Examples of connector assemblies 102 include, for example, rack-mounted connector assemblies (such as patch panels, distribution units, and media converters for fiber and copper physical communication media), wall-mounted connector assemblies (such as boxes, jacks, outlets, and media converters for fiber and copper physical communication media), and inter-networking devices (such as switches, routers, hubs, repeaters, gateways, and access points).

At least some of the connector assemblies 102 are designed for use with segments of physical communication media that have identifier and attribute information stored in or on them. The identifier and attribute information is stored in or on the segment of physical communication media in a manner that enables the stored information, when the segment is attached to a port 104, to be read by a programmable processor 106 associated with the connector assembly 102. Examples of information that can be stored in or on a segment of physical communication media include, without limitation, an identifier that uniquely identifies that particular segment of physical communication media (similar to an ETHERNET Media Access Control (MAC) address but associated with the physical communication media and/or connector attached to the physical communication media), a part number, a plug or other connector type, a cable or fiber type and length, a serial number, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in or on the media segments. For example, testing, media quality, or performance information can be stored in or on the segment of physical communication media. The testing, media quality, or performance information, for example, can be the results of testing that is performed when a particular segment of media is manufactured.

Also, as noted below, in some embodiments, the information stored in or on the segment of physical communication media can be updated. For example, the information stored in or on the segment of physical communication media can be updated to include the results of testing that is performed when a segment of physical media is installed or otherwise checked. In another example, such testing information is supplied to an aggregation point 120 and stored in a data store maintained by the aggregation point 120 (both of which are described below). In another example, the information stored in or on the segment of physical communication media includes a count of the number of times that a connector (not shown) attached to a segment of physical communication media has been inserted into port 104. In such an example, the count stored in or on the segment of physical communication media is updated each time the connector is inserted into port 104. This insertion count value can be used, for example, for warranty purposes (for example, to determine if the connector has been inserted more than the number of times specified in the warranty) or for security purposes (for example, to detect unauthorized insertions of the physical communication media).

In the particular embodiment shown in FIG. 1, each of the ports 104 of the connector assemblies 102 comprises a respective media interface 108 via which the respective programmable processor 106 is able to determine if a physical communication media segment is attached to that port 104 and, if one is, to read the identifier and attribute information stored in or on the attached segment (if such information is stored therein or thereon). The programmable processor 106 associated with each connector assembly 102 is communicatively coupled to each of the media interfaces 108 using a suitable bus or other interconnect (not shown).

In the particular embodiment shown in FIG. 1, four exemplary types of connector assembly configurations are shown. In the first connector assembly configuration 110 shown in FIG. 1, each connector assembly 102 includes its own respective programmable processor 106 and its own respective network interface 116 that is used to communicatively couple that connector assembly 102 to an Internet Protocol (IP) network 118.

In the second type of connector assembly configuration 112, a group of connector assemblies 102 are physically located near each other (for example, in a bay or equipment closet). Each of the connector assemblies 102 in the group includes its own respective programmable processor 106. However, in the second connector assembly configuration 112, some of the connector assemblies 102 (referred to here as "interfaced connector assemblies") include their own respective network interfaces 116 while some of the connector assemblies 102 (referred to here as "non-interfaced connector assemblies") do not. The non-interfaced connector assemblies 102 are communicatively coupled to one or more of the interfaced connector assemblies 102 in the group via local connections. In this way, the non-interfaced connector assemblies 102 are communicatively coupled to the IP network 118 via the network interface 116 included in one or more of the interfaced connector assemblies 102 in the group. In the second type of connector assembly configuration 112, the total number of network interfaces 116 used to couple the connector assemblies 102 to the IP network 118 can be reduced. Moreover, in the particular embodiment shown in FIG. 1, the non-interfaced connector assemblies 102 are connected to the interfaced connector assembly 102 using a daisy chain topology (though other topologies can be used in other implementations and embodiments).

In the third type of connector assembly configuration 114, a group of connector assemblies 102 are physically located near each other (for example, within a bay or equipment closet). Some of the connector assemblies 102 in the group (also referred to here as "master" connector assemblies 102) include both their own programmable processors 106 and network interfaces 116, while some of the connector assemblies 102 (also referred to here as "slave" connector assemblies 102) do not include their own programmable processors 106 or network interfaces 116. Each of the slave connector assemblies 102 is communicatively coupled to one or more of the master connector assemblies 102 in the group via one or more local connections. The programmable processor 106 in each of the master connector assemblies 102 is able to carry out the processing described below for both the master connector assembly 102 of which it is a part and any slave connector assemblies 102 to which the master connector assembly 102 is connected via the local connections. As a result, the cost associated with the slave connector assemblies 102 can be reduced. In the particular embodiment shown in FIG. 1, the slave connector assemblies 102 are connected to a master connector assembly 102 in a star topology (though other topologies can be used in other implementations and embodiments).

Figure 2:
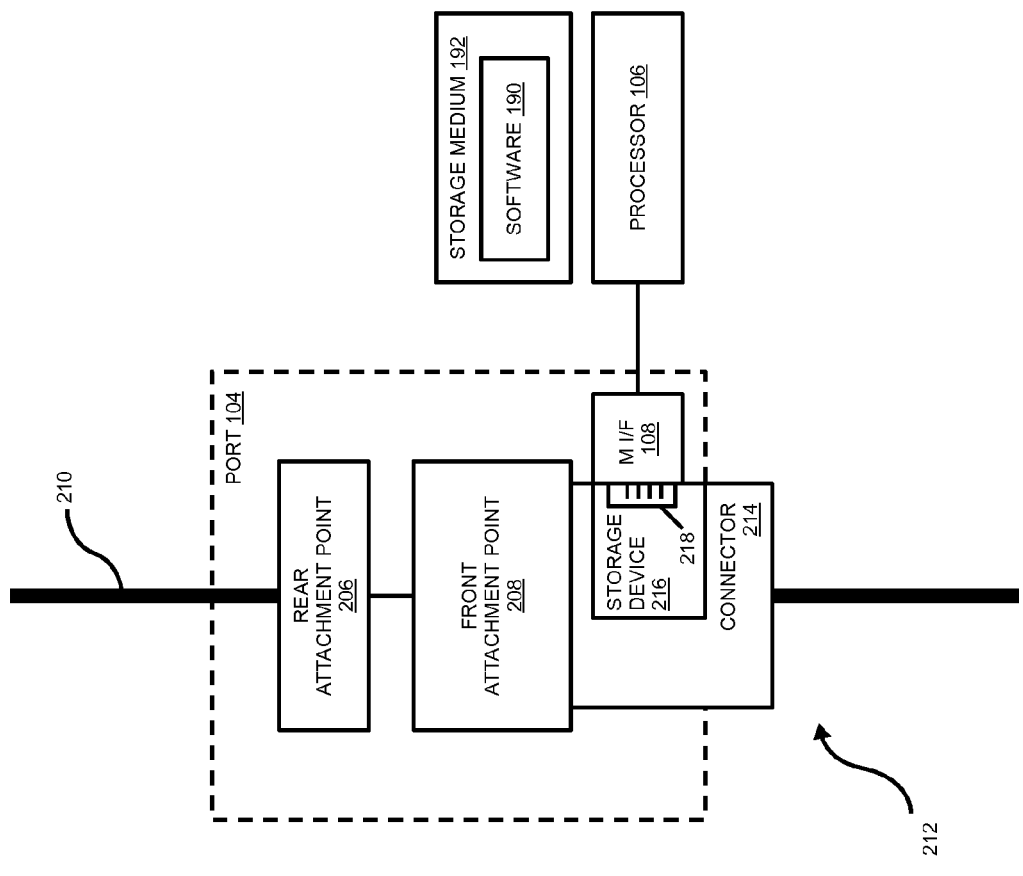
FIG. 2 is a block diagram of one high-level embodiment of a port and media reading interface that are suitable for use in the system of FIG. 1.

Each programmable processor 106 is configured to execute software or firmware 190 (shown in FIG. 2) that causes the programmable processor 106 to carry out various functions described below. The software 190 comprises program instructions that are stored (or otherwise embodied) on an appropriate non-transitory storage medium or media 192 (such as flash or other non-volatile memory, magnetic disc drives, and/or optical disc drives). At least a portion of the program instructions are read from the storage medium 192 by the programmable processor 106 for execution thereby. The storage medium 192 on or in which the program instructions are embodied is also referred to here as a "program product". Although the storage medium 192 is shown in FIG. 2 as being included in, and local to, the connector assembly 102, it is to be understood that remote storage media (for example, storage media that is accessible over a network or communication link) and/or removable media can also be used. Each connector assembly 102 also includes suitable memory (not shown) that is coupled to the programmable processor 106 for storing program instructions and data. In general, the programmable processor 106 (and the software 190 executing thereon) determines if a physical communication media segment is attached to a port 104 with which that processor 106 is associated and, if one is, to read the identifier and attribute information stored in or on the attached physical communication media segment (if the segment includes such information stored therein or thereon) using the associated media interface 108.

As shown in FIG. 1, in the first, second, and third configurations 110, 112, and 114, each programmable processor 106 is also configured to communicate physical layer information to devices that are coupled to the IP network 118. The physical layer information (PLI) includes information about the connector assemblies 102 associated with that programmable processor 106 (also referred to here as "device information") as well as information about any segments of physical media attached to the ports 104 of those connector assemblies 102 (also referred to here as "media information"). The device information includes, for example, an identifier for each connector assembly, a type identifier that identifies the connector assembly's type, and port priority information that associates a priority level with each port. The media information includes identity and attribute information that the programmable processor 106 has read from attached physical media segments that have identifier and attribute information stored in or on it. The media information may also include information about physical communication media that does not have identifier or attribute information stored in or on it. This latter type of media information can be manually input at the time the associated physical media segments are attached to the connector assembly 102 (for example, using a management application executing on the programmable processor 106 that enables a user to configure and monitor the connector assembly 102).

In the fourth type of connector assembly configuration 115, a group of connector assemblies 102 are housed within a common chassis or other enclosure. Each of the connector assemblies 102 in the configuration 115 includes their own programmable processors 106. In the context of this configuration 115, the programmable processors 106 in each of the connector assemblies are "slave" processors 106. Each of the slave programmable processor 106 is also communicatively coupled to a common "master" programmable processor 117 (for example, over a backplane included in the chassis or enclosure). The master programmable processor 117 is coupled to a network interface 116 that is used to communicatively couple the master programmable processor 117 to the IP network 118. In this configuration 115, each slave programmable processor 106 is configured to determine if physical communication media segments are attached to its port 104 and to read the identifier and attribute information stored in or on the attached physical communication media segments (if the attached segments have such information stored therein or thereon) using the associated media interfaces 108. This information is communicated from the slave programmable processor 106 in each of the connector assemblies 102 in the chassis to the master processor 117. The master processor 117 is configured to handle the processing associated with communicating the physical layer information read from by the slave processors 106 to devices that are coupled to the IP network 118.

The system 100 includes functionality that enables the physical layer information that the connector assemblies 102 capture to be used by application-layer functionality outside of the traditional physical-layer management application domain. That is, the physical layer information is not retained in a PLM "island" used only for PLM purposes but is instead made available to other applications. In the particular embodiment shown in FIG. 1, the system 100 includes an aggregation point 120 that is communicatively coupled to the connector assemblies 102 via the IP network 118.

The aggregation point 120 includes functionality that obtains physical layer information from the connector assemblies 102 (and other devices) and stores the physical layer information in a data store.

The aggregation point 120 can be used to receive physical layer information from various types of connector assemblies 106 that have functionality for automatically reading information stored in or on the segment of physical communication media. Examples of such connector assemblies 106 are noted above. Also, the aggregation point 120 and aggregation functionality 124 can also be used to receive physical layer information from other types of devices that have functionality for automatically reading information stored in or on the segment of physical communication media. Examples of such devices include end-user devices—such as computers, peripherals (such as printers, copiers, storage devices, and scanners), and IP telephones—that include functionality for automatically reading information stored in or on the segment of physical communication media.

The aggregation point 120 can also be used to obtain other types of physical layer information. For example, in this embodiment, the aggregation point 120 also obtains information about physical communication media segments that is not otherwise automatically communicated to an aggregation point 120. One example of such information is information about non-connectorized physical communication media segments that do not otherwise have information stored in or on them that are attached to a connector assembly (including, for example, information indicating which ports of the devices are connected to which ports of other devices in the network as well as media information about the segment). Another example of such information is information about physical communication media segments that are connected to devices that are not able to read media information that is stored in or on the media segments that are attached to their ports and/or that are not able to communicate such information to the aggregation point 120 (for example, because such devices do not include such functionality, because such devices are used with media segments that do not have media information stored in or on them, and/or because bandwidth is not available for communicating such information to the aggregation point 120). In this example, the information can include, for example, information about the devices themselves (such as the devices' MAC addresses and IP addresses if assigned to such devices), information indicating which ports of the devices are connected to which ports of other devices in the network (for example, other connector assemblies), and information about the physical media attached to the ports of the devices. This information can be provided to the aggregation point 120, for example, by manually entering such information into a file (such as a spreadsheet) and then uploading the file to the aggregation point 120 (for example, using a web browser) in connection with the initial installation of each of the various items. Such information can also, for example, be directly entered using a user interface provided by the aggregation point 120 (for example, using a web browser).

The aggregation point 120 can also obtain information about the layout of the building or buildings in which the network is deployed, as well as information indicating where each connector assembly 102, physical media segment, and inter-networking device is located within the building. This information can be, for example, manually entered and verified (for example, using a web browser) in connection with the initial installation of each of the various items. In one implementation, such location information includes an X, Y, and Z location for each port or other termination point for each physical communication media segment (for example, X, Y, and Z location information of the type specified in the ANSI/TIA/EIA 606-A Standard (Administration Standard For The Commercial Telecommunications Infrastructure)).

The aggregation point 120 can obtain and maintain testing, media quality, or performance information relating to the various segments of physical communication media that exist in the network. The testing, media quality, or performance information, for example, can be results of testing that is performed when a particular segment of media is manufactured and/or when testing is performed when a particular segment of media is installed or otherwise checked.

The aggregation point 120 also includes functionality that provides an interface for external devices or entities to access the physical layer information maintained by the aggregation point 120. This access can include retrieving information from the aggregation point 120 as well as supplying information to the aggregation point 120. In this embodiment, the aggregation point 120 is implemented as "middleware" that is able to provide such external devices and entities with transparent and convenient access to the PLI maintained by the access point 120. Because the aggregation point 120 aggregates PLI from the relevant devices on the IP network 118 and provides external devices and entities with access to such PLI, the external devices and entities do not need to individually interact with all of the devices in the IP network 118 that provide PLI, nor do such devices need to have the capacity to respond to requests from such external devices and entities.

The aggregation point 120, in the embodiment shown in FIG. 1, implements an application programming interface (API) by which application-layer functionality can gain access to the physical layer information maintained by the aggregation point 120 using a software development kit (SDK) that describes and documents the API. Also, in those embodiments where the connector assemblies 102 include one or more light emitting diodes (LEDs) (for example, where each port 104 has an associated LED), the API and aggregation point 120 can include functionality that enables application-layer functionality to change the state of such LEDs using the API.

For example, as shown in FIG. 1, a network management system (NMS) 130 includes physical layer information (PLI) functionality 132 that is configured to retrieve physical layer information from the aggregation point 120 and provide it to the other parts of the NMS 130 for use thereby. The NMS 130 uses the retrieved physical layer information to perform one or more network management functions (for example, as described below). In one implementation of the embodiment shown in FIG. 1, the PLI functionality 132 of the NMS 130 retrieves physical layer information from the aggregation point 120 using the API implemented by the aggregation point 120. The NMS 130 communicates with the aggregation point 120 over the IP network 118.

As shown in FIG. 1, an application 134 executing on a computer 136 can also use the API implemented by the aggregation point 120 to access the PLI information maintained by the aggregation point 120 (for example, to retrieve such information from the aggregation point 120 and/or to supply such information to the aggregation point 120). The computer 136 is coupled to the IP network 118 and accesses the aggregation point 120 over the IP network 118.

In the embodiment shown in FIG. 1, one or more inter-networking devices 138 used to implement the IP network 118 include physical layer information (PLI) functionality 140. The PLI functionality 140 of the inter-networking device 138 is configured to retrieve physical layer information from the aggregation point 120 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device. In one implementation of such an embodiment, the PLI functionality 140 uses the API implemented by the aggregation point 120 to communicate with the aggregation point 120.

The PLI functionality 140 included in the inter-networking device 138 can also be used to capture physical layer information associated with the inter-network device 138 and the physical communication media attached to it and communicate the captured physical layer information to the aggregation point 120. Such information can be provided to the aggregation point 120 using the API or by using the protocols that are used to communicate with the connector assemblies 102.

The aggregation point 120 can be implemented on a standalone network node (for example, a standalone computer running appropriate software) or can be integrated along with other network functionality (for example, integrated with an element management system or network management system or other network server or network element). Moreover, the functionality of the aggregation point 120 can be distributed across many nodes and devices in the network and/or implemented, for example, in a hierarchical manner (for example, with many levels of aggregation points).

Moreover, the aggregation point 120 and the connector assemblies 102 are configured so that the aggregation point 120 can automatically discover and connect with devices that provide PLI to an aggregation point 120 (such as the connector assemblies 102 and inter-network device 138) that are on the network 118. In this way, when devices that are able to provide PLI to an aggregation point 120 (such as a connector assembly 102 or an inter-networking device 138) are coupled to the IP network 118, an aggregation point 120 is able to automatically discover the connector assembly 102 and start aggregating physical layer information for that connector assembly 102 without requiring the person installing the connector assembly 102 to have knowledge of the aggregation points 120 that are on the IP network 118. Similarly, when an aggregation point 120 is coupled to the IP network 118, the aggregation point 120 is able to automatically discover and interact with devices that are capable of providing PLI to an aggregation point without requiring the person installing the aggregation point 120 to have knowledge of the devices that are on the IP network 118. Thus, the physical-layer information resources described here can be easily integrated into the IP network 118.

The IP network 118 can include one or more local area networks and/or wide area networks (including for example the Internet). As a result, the aggregation point 120, NMS 130, and computer 136 need not be located at the same site as each other or at the same site as the connector assemblies 102 or the inter-networking devices 138.

Various conventional IP networking techniques can be used in deploying the system 100 of FIG. 1. For example, conventional security protocols can be used to secure communications if they are communicated over a public or otherwise unsecure communication channel (such as the Internet or over a wireless communication link).

In one implementation of the embodiment shown in FIG. 1, each connector assembly 102, each port 104 of each connector assembly 102, and each media segment is individually addressable. Where IP addresses are used to individually address each connector assembly 102, a virtual private network (VPN) dedicated for use with the various connector assemblies 102 can be used to segregate the IP addresses used for the connector assemblies 102 from the main IP address space that is used in the IP network 118.

Also, power can be supplied to the connector assemblies 102 using conventional "Power over Ethernet" techniques specified in the IEEE 802.3af standard, which is hereby incorporated herein by reference. In such an implementation, a power hub 142 or other power supplying device (located near or incorporated into an inter-networking device that is coupled to each connector assembly 102) injects DC power onto one or more of the wires (also referred to here as the "power wires") included in the copper twisted-pair cable used to connect each connector assembly 102 to the associated inter-networking device. The interface 116 in the connector assembly 102 picks the injected DC power off of the power wires and uses the picked-off power to power the active components of that connector assembly 102. In the second and third connector assembly configurations 112 and 114, some of the connector assemblies 102 are not directly connected to the IP network 118 and, therefore, are unable to receive power directly from the power wires. These connector assemblies 102 receive power from the connector assemblies 102 that are directly connected to the IP network 118 via the local connections that communicatively couple such connector assemblies 102 to one another. In the fourth configuration 115, the interface 116 picks the injected DC power off of the power wires and supplies power to the master processor 117 and each of the slave processors 106 over the backplane.

In the particular embodiment shown in FIG. 1, the system 100 also supports conventional physical layer management (PLM) operations such as the tracking of moves, adds, and changes of the segments of physical media that are attached to the ports 104 of the connector assemblies 102 and providing assistance with carrying out moves, adds, and changes (also referred to here as a "MAC" or "move-add-change"). PLI provided by the aggregation point 120 can be used to improve upon conventional "guided MAC" processes. For example, information about the location of the port 104 and the visual appearance (for example, the color or shape) of the relevant physical media segment (or connector attached thereto) can be communicated to a technician to assist the technician in carrying out a move, add, or change. This information can be communicated to a computer or smartphone used by the technician. Moreover, the PLI functionality that resides in the system 100 can also be used to verify that a particular MAC was properly carried out by checking that the expected physical media segment is located in the expected port 104. If that is not the case, an alert can be sent to the technician so that the technician can correct the issue.

The PLM functionality included in the system 100 can also support conventional techniques for guiding the technician in carrying out a move-add-change (for example, by illuminating one or more light emitting diodes (LEDs) to direct a technician to a particular connector assembly 102 and/or to a particular port 104 or by displaying messages on a liquid crystal display (LCD) included on or near the connector assemblies 102).

Other PLM functions include keeping historical logs about the media connected to the connector assembly. In the embodiment shown in FIG. 1, the aggregation point 120 includes PLM functionality 144 that implements such PLM functions. The PLM functionality 144 does this using the physical layer information that is maintained at the aggregation point 120.

The IP network 118 is typically implemented using one or more inter-networking devices. As noted above, an inter-networking device is a type of connector assembly (and a particular implementation of an inter-networking device 138 is referenced separately in FIG. 1 for ease of explanation only). Generally, an inter-networking device can be configured to read media information that is stored in or on the segments of physical media that are attached to its ports and to communicate the media information it reads from the attached segments of media (as well as information about the inter-networking device itself) to an aggregation point 120 like any other connector assembly described here.

In addition to connector assemblies 102, the techniques described here for reading media information stored in or on a segment of physical communication media can be used in one or more end nodes of the IP network 118. For example, computers (such as, laptops, servers, desktop computers, or special-purpose computing devices such as IP telephones, IP multi-media appliances, and storage devices) can be configured to read media information that is stored in or on the segments of physical communication media that are attached to their ports and to communicate the media information they read from the attached segments of media (as well as information about the devices themselves) to an aggregation point 120 as described here.

In one implementation of the system 100 shown in FIG. 1, the ports 104 of each connector assembly 102 are used to implement the IP network 118 over which each connector assembly 102 communicates physical layer information associated with that connector assembly 102. In such an implementation, such physical layer information is communicated over the IP network 118 just like any other data that is communicated over the IP network 118. As noted below, the media interface 108 determines if a physical communication media segment is attached to the corresponding port 104 and, if one is, reads the identifier and attribute information stored in or on the attached segment (if such information is stored therein or thereon) without affecting the normal data signals that pass through that port 104. Indeed, such physical layer information may actually pass through one or more of the ports 104 of connector assemblies 102 in the course of being communicated to and/or from a connector assembly 102, aggregation point 150, network management system 130, and/or computer 136. By using the IP network 118 to communicate physical layer information pertaining to it, a separate network need not be provided and maintained in order to communicate such physical-layer information. However, in other implementations and embodiments, the physical layer information described above is communicated using a network that is separate from the network to which such physical layer information pertains.

FIG. 2 is a block diagram of one high-level embodiment of a port 104 and media interface 108 that are suitable for use in the system 100 of FIG. 1.

Each port 104 comprises a first attachment point 206 and a second attachment point 208. The first attachment point 206 is used to attach a first segment of physical communication media 210 to the port 104, and the second attachment point 208 is used to attach a second segment of physical communication media 212 to the port 104.

In the particular embodiment shown in FIG. 2, the first attachment point 206 is located near the rear of the connector assembly. As a consequence, the first attachment point 206 and the first segment of physical media 210 attached thereto are also referred to here as the "rear attachment point" 206 and the "rear media segment" 210, respectively. Also, in this embodiment, the rear attachment point 206 is configured to attach the rear media segment 210 to the port 104 in a semi-permanent manner. As used herein, a semi-permanent attachment is one that is designed to be changed relatively infrequently, if ever. This is also referred to sometimes as a "one-time" connection. Examples of suitable rear connectors 206 include punch-down blocks (in the case of copper physical media) and fiber adapters, fiber splice points, and fiber termination points (in the case of optical physical media).

In the embodiment shown in FIG. 2, the second attachment point 208 is located near the front of the connector assembly 102. As a consequence, the second attachment point 208 and the second segment of physical media 212 are also referred to here as the "front attachment point" 208 and the "front media segment" 212, respectively. In the embodiment shown in FIG. 2, the front attachment point 208 for each port 104 is designed for use with "connectorized" front media segments 212 that have identifier and attribute information stored in or on them. As used herein, a "connectorized" media segment is a segment of physical communication media that includes a connector 214 at at least one end of the segment. The front attachment point 208 is implemented using a suitable connector or adapter that mates with the corresponding connector 214 on the end of the front media segment 212. The connector 214 is used to facilitate the easy and repeated attachment and unattachment of the front media segment 212 to the port 104. Examples of connectorized media segments include CAT-5, 6, and 7 twisted-pair cables having modular connectors or plugs attached to both ends (in which case, the front connectors are implemented using compatible modular jacks) or optical cables having SC, LC, FC, LX.5, MTP, or MPO connectors (in which case, the front connectors are implemented using compatible SC, LC, FC, LX.5, MTP, or MPO connectors or adapters). The techniques described here can be used with other types of connectors including, for example, BNC connectors, F connectors, DSX jacks and plugs, bantam jacks and plugs, and MPO and MTP multi-fiber connectors and adapters.

Each port 104 communicatively couples the respective rear attachment point 206 to the respective front attachment point 208. As a result, a rear media segment 210 attached to the respective rear attachment point 206 is communicatively coupled to any front media segment 212 attached to the respective front attachment point 208. In one implementation, each port 104 is designed for use with a rear media segment 210 and a front media segment 212 that comprise the same type of physical communication media, in which case each port 104 communicatively couples any rear media segment 210 attached to the respective rear attachment point 206 to any front media segment 212 attached to the respective front attachment point 208 at the physical layer level without any media conversion. In other implementations, each port 104 communicatively couples any rear media segment 210 attached to the respective rear attachment point 206 to any front media segment 212 attached to the respective front attachment point 208 in other ways (for example, using a media converter if the rear media segment 210 and the front media segment 212 comprise different types of physical communication media).

In the exemplary embodiment shown in FIG. 2, the port 104 is configured for use with front media segments 212 that include a storage device 216 in which the media information for that media segment 212 is stored. The storage device 216 includes a storage device interface 218 that, when the corresponding connector 214 is inserted into (or otherwise attached to) a front attachment point 208 of the port 104, communicatively couples the storage device 216 to a corresponding media interface 108 so that the associated programmable processor 106 can read the information stored in the storage device 216. In one implementation of the embodiment shown in FIG. 2, each connector 214 itself houses the storage device 216. In another implementation of such an embodiment, the storage device 216 is housed within a housing that is separate from the connector 214. In such an implementation, the housing is configured so that it can be snapped onto the media segment 212 or the connector 214, with the storage device interface 218 positioned relative to the connector 214 so that the storage device interface 218 will properly mate with the media interface 108 when the connector 214 is inserted into (or otherwise attached to) the front attachment point 208. Although in the exemplary embodiment shown in FIG. 2 only the front media segments 212 include storage devices 216, it is to be understood that in other embodiments connector assemblies and/or other devices are configured to read storage devices that are attached to (or otherwise included with) rear media segments 210 and/or any "auxiliary" media segments (for example, media segments coupled to the network interface 116).

In some implementations, at least some of the information stored in the storage device 216 can be updated in the field (for example, by having an associated programmable processor 106 cause additional information to be written to the storage device 216 or changing or deleting information that was previously stored in the storage device 216). For example, in some implementations, some of the information stored in the storage device 216 cannot be changed in the field (for example, identifier information or manufacturing information) while some of the other information stored in the storage device 216 can be changed in the field (for example, testing, media quality, or performance information). In other implementations, none of the information stored in the storage device 216 can be updated in the field.

Also, the storage device 216 may also include a processor or micro-controller, in addition to storage for the media information. In which case, the micro-controller included in the storage device 216 can be used to execute software or firmware that, for example, controls one or more LEDs attached to the storage device 216. In another example, the micro-controller executes software or firmware that performs an integrity test on the front media segment 212 (for example, by performing a capacitance or impedance test on the sheathing or insulator that surrounds the front physical communication media segment 212 (which may include a metallic foil or metallic filler for such purposes)). In the event that a problem with the integrity of the front media segment 212 is detected, the micro-controller can communicate that fact to the programmable processor 106 associated with the port 104 using the storage device interface 218. The micro-controller can also be used for other functions.

The port 104, connector 214, storage device 216, and media interface 108 are configured so that the information stored in the storage device 216 can be read without affecting the communication signals that pass through the media segments 210 and 212.

Further details regarding system 100 and the port 104 can be found in the following United States Patent Applications, all of which are hereby incorporated herein by reference: U.S. Provisional Patent Application Ser. No. 61/152,624, filed on Feb. 13, 2009, titled "MANAGED CONNECTIVITY SYSTEMS AND METHODS" (also referred to here as the "'624 application"); U.S. patent application Ser. No. 12/705,497, filed on Feb. 12, 2010, titled "AGGREGATION OF PHYSICAL LAYER INFORMATION RELATED TO A NETWORK" (is also referred to here as the '497 application); U.S. patent application Ser. No. 12/705,501, filed on Feb. 12, 2010, titled "INTER-NETWORKING DEVICES FOR USE WITH PHYSICAL LAYER INFORMATION" (also referred to here as the '501 application); U.S. patent application Ser. No. 12/705,506, filed on Feb. 12, 2010, titled "NETWORK MANAGEMENT SYSTEMS FOR USE WITH PHYSICAL LAYER INFORMATION" (also referred to here as the '506 application); U.S. patent application Ser. No. 12/705,514, filed on Feb. 12, 2010, titled "MANAGED CONNECTIVITY DEVICES, SYSTEMS, AND METHODS" (also referred to here as the '514 application); U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 application"); U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 application"); U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 application"); U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 application"); U.S. Provisional Patent Application Ser. No. 61/303,961, filed on Feb. 12, 2010, titled "FIBER PLUGS AND ADAPTERS FOR MANAGED CONNECTIVITY" (the "'961 application"); and U.S. Provisional Patent Application Ser. No. 61/303,948, filed on Feb. 12, 2010, titled "BLADED COMMUNICATIONS SYSTEM" (the "'948 application").

FIG. 3A is a diagram illustrating one exemplary embodiment of a front media segment. In the embodiment shown in FIG. 3A, the front media segment comprises a "patch cord" 312 that is used to selectively cross-connect two ports of the same or different patch panels. The patch cord 312 shown in FIG. 3A is suitable for use with an implementation of a patch panel where the front connectors of the ports are implemented using modular RJ-45 jacks. The patch cord 312 shown in FIG. 3A comprises a copper unshielded twisted-pair (UTP) cable 386. The UTP cable 386 includes eight conductors arranged in four conductor pairs. The patch cord 312 also comprises two RJ-45 plugs 314, one at each end of the cable 386 (only one of which is shown in FIG. 3A). The RJ-45 plugs 314 are designed to be inserted into the RJ-45 modular jacks used as the front connectors. Each RJ-45 plug 314 comprises a contact portion 388 in which eight, generally parallel electrical contacts 390 are positioned. Each of the eight electrical contacts 390 are electrically connected to one of the eight conductors in the UTP cable 386.

Each plug 314 also comprises (or is attached to) a storage device 392 (for example, an Electrically Erasable Programmable Read-Only Memory (EEPROM) or other non-volatile memory device). The media information described above for the patch cord 312 is stored in the storage device 392. The storage device 392 includes sufficient storage capacity to store such information. Each storage device 392 also includes a storage device interface 394 that, when the corresponding plug 314 is inserted into a front connector of a port 304, communicatively couples the storage device 392 to the corresponding media reading interface so that the programmable processor 320 in the corresponding patch panel 302 can read the information stored in the storage device 392.

Examples of such a patch cord 312 and plug 314 are described in the '395 application, the '208 application, and the '964 application.

FIG. 3B is a diagram illustrating another exemplary embodiment of a patch cord 312'. The patch cord 312' shown in FIG. 3B is suitable for use with a fiber patch panel where the front connectors of the ports are implemented using fiber LC adapters or connectors. The patch cord 312' shown in FIG. 3B comprises an optical cable 386'. The optical cable 386' includes an optical fiber enclosed within a suitable sheathing. The patch cord 312' also comprises two LC connectors 314', one at each of the cable 386'. Each LC connector 314' is designed to be inserted into an LC adapter used as the front connector of a port of a fiber patch panel. Each LC connector 314' comprises an end portion 388' at which an optical connection with the optical fiber in the cable 386' can be established when the LC connector 314' is inserted in an LC adapter of a port.

Each LC connector 314' also comprises (or is attached to) a storage device 392' (for example, an Electrically Erasable Programmable Read-Only Memory (EEPROM) or other non-volatile memory device). The media information described above for the patch cord 312 is stored in the storage device 392'. The storage device 392' includes sufficient storage capacity to store such information. Each storage device 392' also includes a storage device interface 394' that, when the corresponding LC connector 314' is inserted into a front connector of a port, communicatively couples the storage device 392' to the corresponding media reading interface so that the programmable processor in the corresponding fiber patch panel can read the information stored in the storage device 392'.

In some implementations of the patch cords 312 and 312', the storage devices 392 and 392' are implemented using a surface-mount EEPROM or other non-volatile memory device. In such implementations, the storage device interfaces and media reading interfaces each comprise four leads—a power lead, a ground lead, a data lead, and an extra lead that is reserved for future use. In one such implementation, an EEPROM that supports a serial protocol is used, where the serial protocol is used for communicating over the signal data lead. The four leads of the storage device interfaces come into electrical contact with four corresponding leads of the media reading interface when the corresponding plug or connector is inserted in the corresponding front connector of a port 304. Each storage device interface and media reading interface are arranged and configured so that they do not interfere with data communicated over the patch cord. In other embodiments, other types of interfaces are used. For example, in one such alternative embodiment, a two-line interface is used with a simple charge pump. In other embodiments, additional lines are provided (for example, for potential future applications).

Examples of such fiber patch cords 312' and connectors 314' are described in U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 application"), U.S. Provisional Patent Application Ser. No. 61/303,961, filed on Feb. 12, 2010, titled "FIBER PLUGS AND ADAPTERS FOR MANAGED CONNECTIVITY" (the "'961 application"), and U.S. Provisional Patent Application Ser. No. 61/303,948, filed on Feb. 12, 2010, titled "BLADED COMMUNICATIONS SYSTEM" (the "'948 application"). The '386 application, the '961 application, and the '948 application are hereby incorporated herein by reference.

In some implementations of the patch cords 312 and 312', each plug 314 or connector 314' itself houses the respective storage device and storage device interface. In implementations, each storage device and corresponding storage device interface are housed within a housing that is separate from the corresponding plug or connector. In such implementations, the housing is configured so that it can be snapped onto (or otherwise attached to) the cable or the plug or connector, with the storage device interface positioned relative to the plug or connector so that the storage device interface will properly mate with the relevant media reading interface when the plug or connector is inserted into the front connector of the corresponding port.

Moreover, functionality described here as being implemented in software executing on a programmable processor can be implemented in other ways. For example, such functionality can be implemented in hardware using discrete hardware, application-specific integrated circuits (ASICS)), programmable devices (such as field-programmable gate arrays (FPGAs) or complex programmable logic devices (CPLDs)), and/or combinations of one or more of the foregoing, and/or combinations of one or more of the foregoing along with software executing on one or more programmable processors. For example, the detection of the insertion of a connector 214 into a port 104 of a connector assembly 102 and/or the reading of information from any storage device 216 attached to the connector 214 can be implemented in hardware (for example, using one or more programmable devices and/or an ASIC) in addition to or instead of being implemented as software.

As noted above, the aggregation point 120 is configured to automatically discover and connect to devices (such as connector assemblies 102) that are able to provide PLI and other information to the aggregation point 120. In some embodiments of system 100, the aggregation point 120 is configured to monitor events occurring at each of the connector assemblies 102. For example, where the connector assemblies 102 comprise patch panels, the aggregation point 120 can be configured to monitor events associated with a patch cord being inserted into or removed from a port 104 of that patch panel.

Some event monitoring schemes use the Simple Network Management Protocol (SNMP). In some SNMP-based event monitoring schemes, an SNMP client is configured to send SNMP traps to a SNMP management station to notify the management station of the occurrence of events associated with that SNMP agent. However, since SNMP is based on the User Data Protocol (UDP), which is a connection-less and unreliable protocol, SNMP traps may arrive out of order, appear duplicated, or go missing without the management station or SNMP agent noticing.

Also, in some usage scenarios for embodiments of system 100, a user (such as a technician) who is causing events to occur at a particular connector assembly 102 (for example, by inserting or removing a patch cord into or from a port of a patch panel) will use a laptop, handheld computer, smartphone, or other device to establish a connection with an aggregation point 120 and display on that device information about the current state of that particular connector assembly 102. For example, a graphical representation of the patch panel, and the status of the ports thereof, can be displayed on the user's device with a visual indication of whether or not a patch cord is inserted into each port of the patch panel. When the user inserts a patch cord into a previously open port of the patch panel or removes a patch cord from a previously occupied port of the patch panel, it is desirable that the graphical representation of the patch-panel be updated sufficiently fast so that the user is unable to perceive any latency between inserting or removing the patch cord and the graphical representation of the patch-panel being updated to reflect that event. This typically requires the update to take no more than 250 milliseconds.

Figure 4:
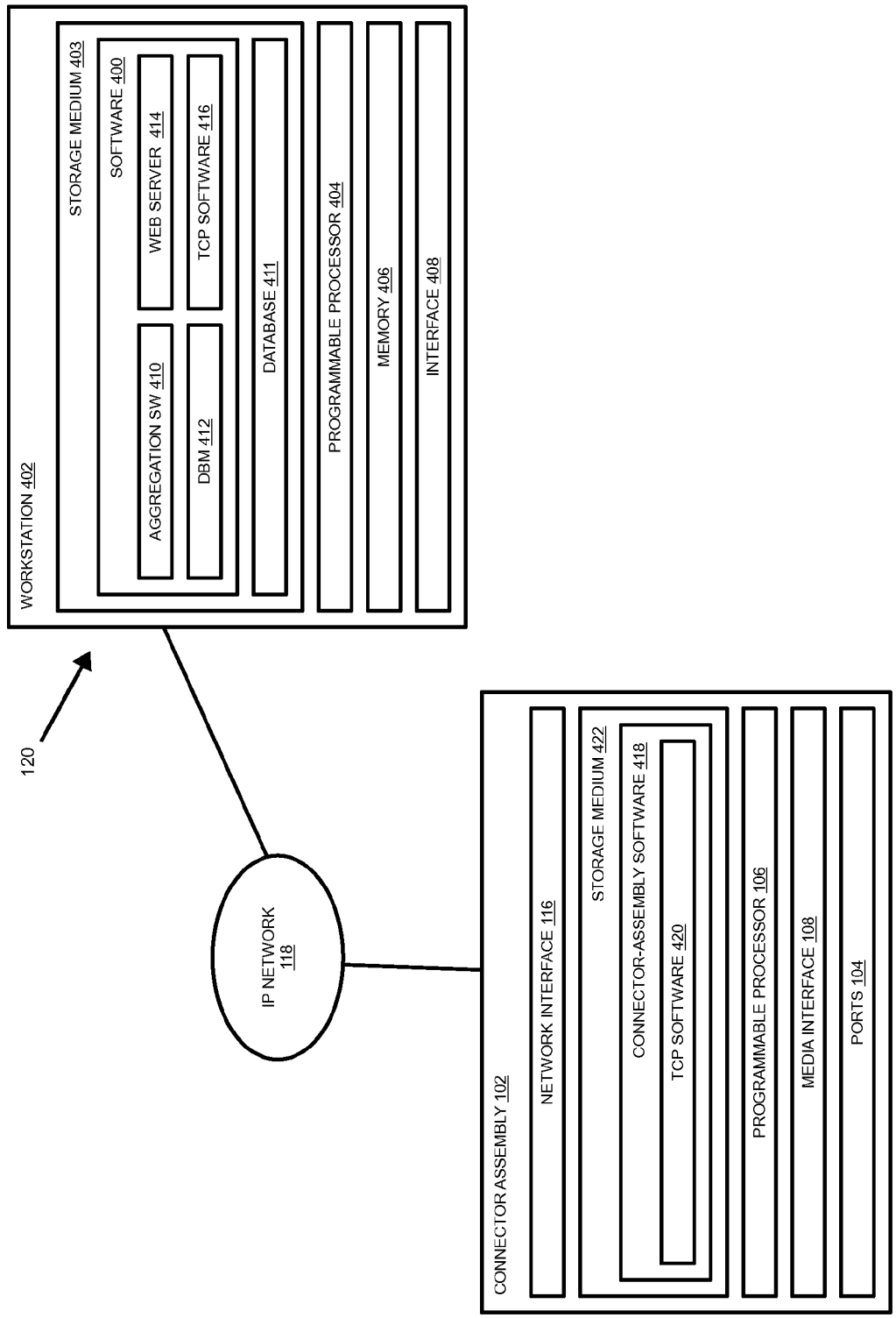
FIG. 4 is a block diagram of one exemplary embodiment of a system in which a reliable packet-based communication protocol is used by an aggregation point to monitor events occurring at a device.

FIG. 4 is directed to one exemplary embodiment of a system 100 in which a reliable packet-based communication protocol is used by the aggregation point 120 to monitor events occurring at at least one connector assembly 102. In the exemplary embodiment shown in FIG. 4, the reliable packet-based communication protocol that is used is the Transmission Control Protocol (TCP), defined at least in part by various Request For Comment (RFC) documents currently maintained by the Internet Engineering Task Force (IETF), including but not limited to RFC 793 and the updates, extensions, and errata thereto. TCP is routable across subnets and is typically included in implementations of the widely available TCP/IP protocol stack. However, it is to be understood that other reliable packet-based communication protocols (such as Reliable UDP (RUDP), defined at least in part in RFCs 908 and 1151, and reliable protocols built directly on top of the ETHERNET protocol, defined at least in part in the Institute of Electrical and Electronics Engineers (IEEE) 802.3 family of standards) can be used in other embodiments.

In the exemplary embodiment shown in FIG. 4, the aggregation point 120 is described here as being implemented for use in the system 100 of FIG. 1, though other embodiments can be implemented in other ways. The aggregation point 120 is typically implemented as software 400 that executes on a workstation or other computer 402. The workstation 402 comprises at least one programmable processor 404 on which the software 400 executes. The software 400 comprises program instructions that are stored (or otherwise embodied) on an appropriate non-transitory storage medium or media 403 from which at least a portion of the program instructions can be read by the programmable processor 404 for execution thereby. The storage medium 403 on or in which the program instructions are embodied is also referred to here as a "program product". Although the storage medium 403 is shown in FIG. 4 as being included in, and local to, the workstation 402, it is to be understood that remote storage media (for example, storage media that is accessible over a network or communication link) and/or removable media can also be used. The workstation 402 also comprises memory 406 for storing the program instructions and any related data during execution of the software 400.

The workstation 402 on which the aggregation point software 400 executes also includes one or more interfaces 408 that communicatively couple the aggregation point 120 to devices or entities with which it communicates. More specifically, the one or more interfaces 408 communicatively couple the aggregation point 120 to these devices or entities over the IP network 118. In one implementation of such an embodiment, at least one of the interfaces 408 comprises an ETHERNET network interface for coupling the aggregation point 120 to the one or more IP networks 118 (which are implemented, at least in part, using ETHERNET local area networks).

The aggregation point software 400 comprises aggregation software 410 that enables the aggregation point 120 to automatically discover and communicate with devices (for example, connector assemblies 102 such as patch panels) that are able provide PLI and other information to the aggregation point 120. The aggregation point 120 and the aggregation software 410 can be used to receive physical layer information from various types of connector assemblies that have functionality for automatically reading information stored in or on a segment of physical communication media. Examples of such devices are noted above and include, for example, patch panels and inter-networking devices. Also, the aggregation point 120 and aggregation software 410 can also be used to receive physical layer information from other types of devices that have functionality for automatically reading information stored in or on the segment of physical communication media. Examples of such devices include end-user devices—such as computers, peripherals (for example, printers, copiers, storage devices, and scanners), and IP telephones—that include functionality for automatically reading information stored in or on the segment of physical communication media.

In the exemplary embodiment shown in FIG. 4, the aggregation software 410 is configured to use one or more discovery protocols to discover devices that are able to provide PLI information to the aggregation point 120 (assuming those devices also support those discovery protocols). Likewise, when the aggregation point 120 is connected to the IP network 118, the PLI aggregation software 410 uses the discovery protocols to broadcast an informational message to all the nodes on the IP network 118. In this way, when devices that are able to provide PLI to the aggregation point 120 are coupled to the IP network 118, the aggregation points 120 is able to automatically discover the device and start aggregating physical layer information for that device without requiring a technician installing the device to know about the aggregation points that are on the network 118. Similarly, when the aggregation point 120 is coupled to the network 118, the aggregation point 120 is able to automatically discover and interact with devices that are capable of providing PLI to the aggregation point 120 without requiring the technician installing the aggregation point 120 to know about such devices that are on the network 118. Thus, the physical-layer information resources described here can be easily integrated into the network 118. Additional details regarding the discovery protocol are provided in the '497 application.

In the exemplary embodiment shown in FIG. 4, the aggregation software 410 is also configured to obtain physical layer information from the devices (for example, devices such as patch panels) it has discovered using the discovery protocol. A database manager (DBM) 412 is used to store the information that the aggregation software 410 obtains in a database 411. In the exemplary embodiment shown in FIG. 4, the database 411 is shown as being stored on the same storage medium 403 as the software 400, though it is to be understood that this need not be the case. Moreover, though the database 411 is shown in FIG. 4 as being stored on a storage medium 403 that is included in, and local to, the workstation 402, it is to be understood that remote storage media (for example, storage media that is accessible over a network or communication link) and/or removable media can also be used.

In the particular embodiment shown in FIG. 4, the aggregation software 410 uses one or more appropriate protocols to communicate physical layer information to and from such devices. The devices that the aggregation point 120 receives information from also implement at least some of the protocols implemented by the aggregation point 120 to organize, track, store, and communicate physical layer information. Additional details regarding this are provided in the '497 application.

The aggregation point 120 and aggregation software 410 can also be used to obtain other types of physical layer information. For example, in this embodiment, the aggregation software 410 also obtains information about physical communication media segments that is not otherwise automatically communicated to an aggregation point 120. One example of such information is information about non-connectorized cables that do not otherwise have information stored in or on them that are attached to a patch panel or other connector assembly 102 (including, for example, information indicating which ports of the patch panel are connected to which ports of other devices in the network 118 by a particular patch cord as well as media information about the patch cord).

Another example of such information is information about patch cords (or other physical-layer communication media) that are connected to devices that are not able to read media information that is stored in or on the patch cords that are attached to their ports and/or that are not able to communicate such information to the aggregation point 120 (for example, because such devices do not include such functionality, because such devices are used with patch cords that do not have media information stored in or on them, and/or because bandwidth is not available for communicating such information to the aggregation point 120). In this example, this information can include, for example, information about the devices themselves (such as the devices' MAC addresses and IP addresses if assigned to such devices), information indicating which ports of the devices are connected to which ports of other devices in the network, and information about the physical media attached to the ports of the devices. This information can be provided to the aggregation point 120, for example, by manually entering such information into a file (such as a spreadsheet) and then uploading the file to the aggregation point 120 in connection with the initial installation of each of the various devices. Such information can also, for example, be directly entered using a user interface provided by the aggregation point 120 (for example, using a web browser). In the embodiment shown in FIG. 4, the aggregation point software 410 includes a web server 414 to facilitate the upload of files and/or the direct entry of such manually entered information.

The aggregation software 410 can also obtain information about the layout of the building or buildings in which the network 118 is deployed, as well as information indicating where each patch panel or other connector assembly 102, patch cord (or other item of physical communication media), and inter-networking device is located within the building as well as testing, media quality, or performance information relating to the various items of physical communication media that exist in the network.

The aggregation software 410 is also configured to provide an interface for external devices or entities to access the physical layer information maintained by the aggregation point 120. This access can include retrieving information from the aggregation point 120 as well as supplying information to the aggregation point 120. In this embodiment, the aggregation point 120 is implemented as "middleware" that is able to provide such external devices and entities with transparent and convenient access to the PLI maintained by the access point 120. Because the aggregation point 120 aggregates PLI from the relevant devices on the IP network 118 and provides external devices and entities with access to such PLI, the external devices and entities do not need to individually interact with all of the devices in the IP network 118 that provide PLI, nor do such devices need to have the capacity to respond to requests from such external devices and entities.

The aggregation software 410, in the embodiment shown in FIG. 4, implements an application programming interface (API) by which application-layer functionality in such other devices can gain access to the physical layer information maintained by the aggregation point 120 using a software development kit (SDK) that describes and documents the API. In one implementation of such an embodiment, the aggregation software 410 is configured to use the Simple Object Access Protocol (SOAP) protocol for communications between the aggregation point 120 and such external devices or entities. In other implementations, other protocols can be used (for example, the SNMP protocols).

For example, an application 134 (shown in FIG. 1) executing on a computer 136 can use the API provided by the aggregation point 120 to access the PLI information maintained by the aggregation point 120 (for example, to retrieve such information from the aggregation point 120 and/or to supply information to the aggregation point 120). The computer 136 is coupled to the network 118 and accesses the aggregation point 120 over the network 118. As noted above, one example of such an application 134 is configured to display for a user a graphical representation of a particular patch panel or other connector assembly 102 and the status of the ports 104 thereof, with a visual indication of whether or not a patch cord (or other item of physical communication media) is inserted into each port 104 of the patch panel.

In the particular exemplary embodiment shown in FIG. 4, the aggregation software 410 is also configured to monitor events occurring at each of the connector assemblies 102 for which that aggregation point 120 aggregates information. The software 400 that is used to implement the aggregation point 120 includes TCP software 416 (for example, provided as a part of a TCP/IP protocol stack included with the operating system executed by the workstation 402). The TCP software 416 is also referred to here as the "aggregation-point TCP software 416". As described in more detail below, the aggregation software 410 uses the TCP protocol (and the TCP software 416) to monitor events occurring at the connector assemblies 102 for which that aggregation point 120 aggregates information.

In the exemplary embodiment shown in FIG. 4, each programmable processor 106 or 117 associated with each of the connector assemblies 102 runs software 418 that interacts with the aggregation point 120. The software 418 comprises program instructions that are stored (or otherwise embodied) on an appropriate non-transitory storage medium or media 422 from which at least a portion of the program instructions can be read by the programmable processor 106 or 117 for execution thereby. The storage medium 422 on or in which the program instructions are embodied is also referred to here as a "program product". Although the storage medium 422 is shown in FIG. 4 as being included in, and local to, the connector assembly 102, it is to be understood that remote storage media (for example, storage media that is accessible over a network or communication link) and/or removable media can also be used.

The software 418 is also referred to here as "connector-assembly software 418". The connector-assembly software 418 includes TCP software 420 (also referred to here as the "connector-assembly TCP software 420") that implements the TCP protocol in order to communicate with the aggregation-point TCP software 416. As described in more detail below, the connector-assembly software 418 uses the connector-assembly TCP software 420 to notify the aggregation point 120 (more specifically, the aggregation software 410) of any events that occur at any associated connector assembly 102. For example, in master-slave connector assembly configurations (such as configurations 114 and 115 shown in FIG. 1), the programmable processor 106 in the master connector assembly 102 (in the case of configuration 114) and the master programmable processor 117 (in the case of configuration 115) executes the connector-assembly software 418 for all of the connector assemblies 102 that are included in that configuration 115. In connector assembly configurations where each connector assembly 102 includes a "peer" programmable processor 106 that communicates with the aggregation point 120 (such as configurations 110 and 112 shown in FIG. 1), each programmable processor 106 in each of the connector assemblies 102 executes the connector-assembly software 418.

Figure 5:
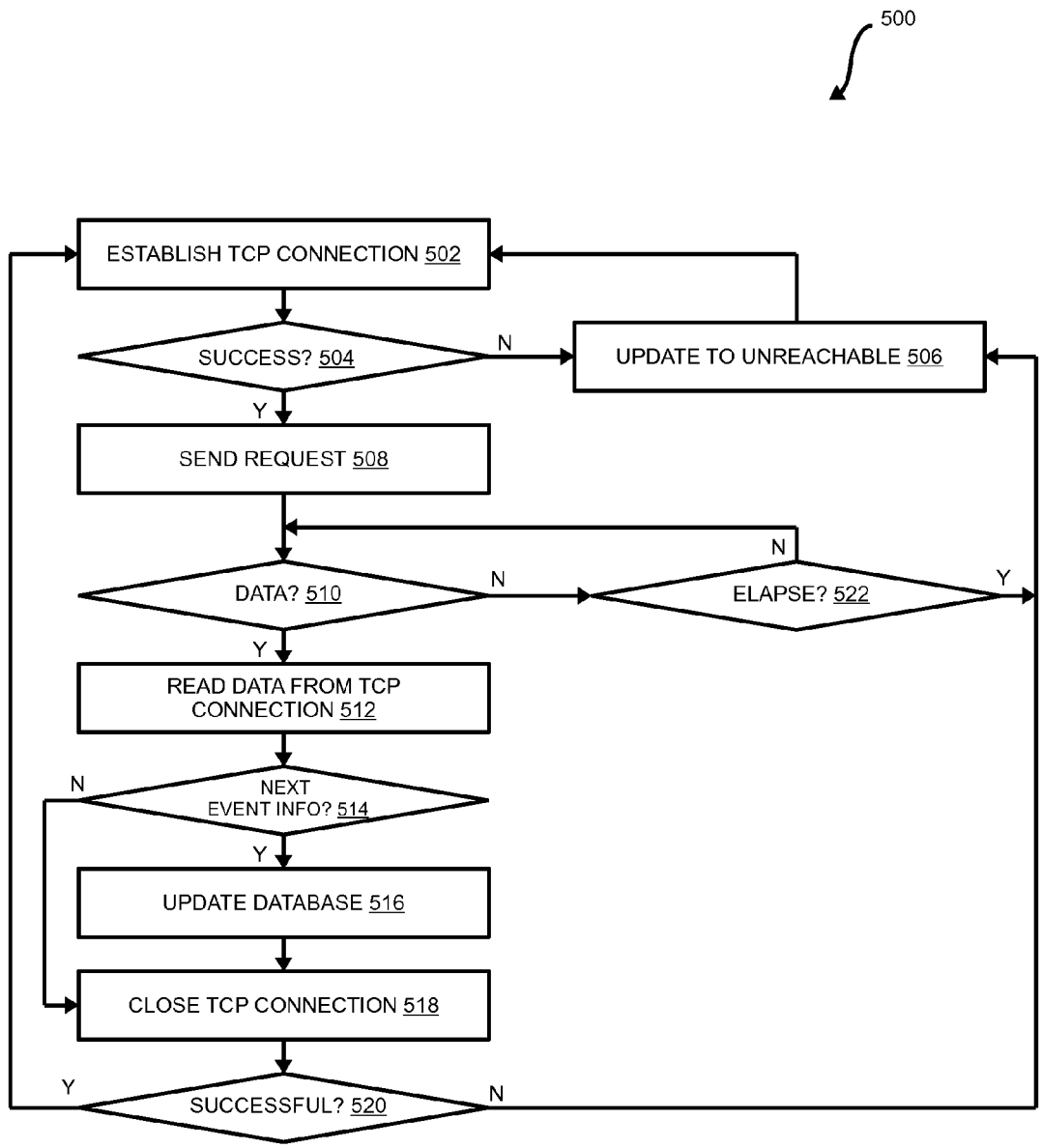
FIG. 5 is a flow diagram of one exemplary embodiment of a method of aggregating information received from one or more connector assemblies.
Figure 6:
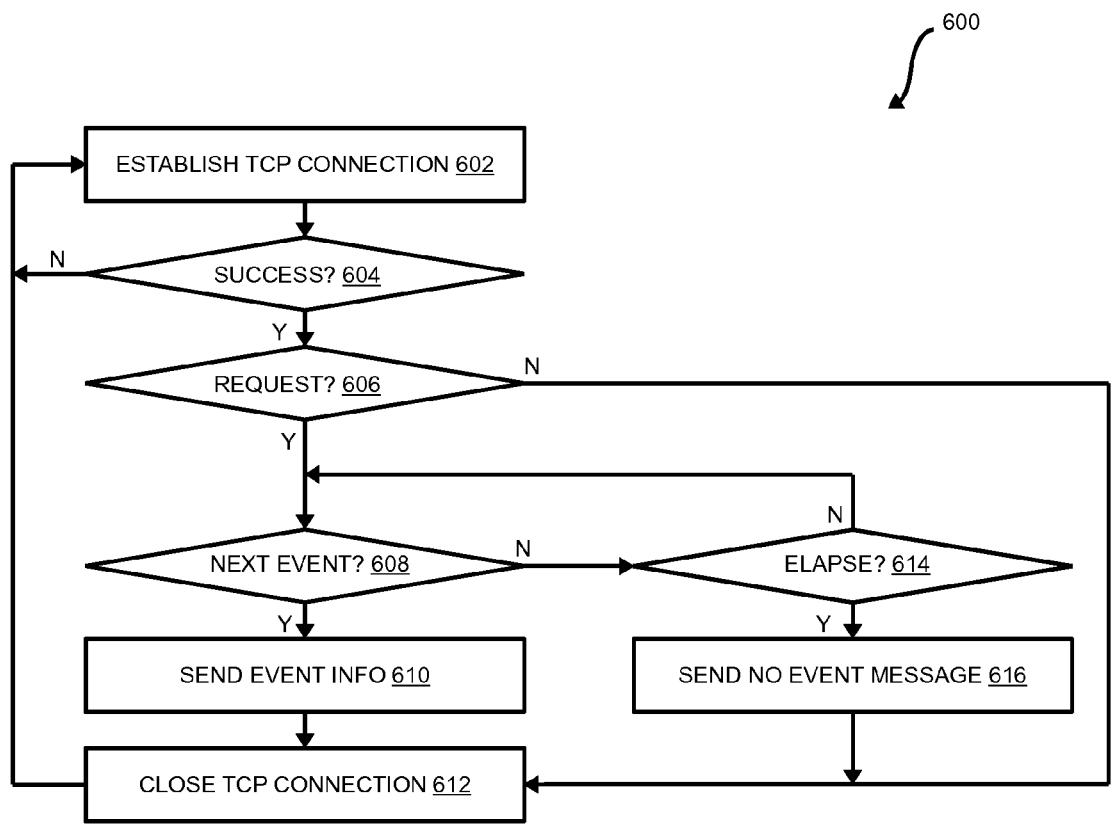
FIG. 6 is a flow diagram of one exemplary embodiment of a method of reporting event information to an aggregation point.

One example of how event-monitoring can be performed using a reliable packet-based communication protocol is shown in FIGS. 5 and 6. FIG. 5 is a flow diagram of one exemplary embodiment of a method 500 of aggregating information received from one or more connector assemblies 102. In this example, the processing of method 500 is described here as being performed by a particular entity in the system 100 (that is, the software 400 executing on the aggregation point 120), though it is to be understood that other embodiments can be implemented in other ways. FIG. 6 is a flow diagram of one exemplary embodiment of a method 600 of reporting event information to an aggregation point 120. In this example, the processing of method 600 is described here as being performed by a second entity in the system 100 (that is, an instance of the connector-assembly software 418), though it is to be understood that other embodiments can be implemented in other ways.

In the example shown in FIGS. 5 and 6, the reliable packet-based communication protocol that is used is TCP. However, it is to be understood that other reliable packet-based communication protocols (such as RUDP and reliable protocols built directly on top of the ETHERNET protocol) can be used in other embodiments. Also, this example is described here as being implemented in the embodiment of system 100 described here in connection with FIGS. 1, 2, 3A-3B, and 4 (though other embodiments can be implemented in other ways).

For ease of explanation, the example shown in FIGS. 5 and 6 is described here with respect to a single instance of the connector-assembly software 418 executing on a programmable processor 106 or 117. As noted above, each such instance of the connector-assembly software 418 is associated with one or more connector assemblies 102. However, it is to be understood that the processing described below in connection with FIG. 5 is typically implemented for each instance of the connector-assembly software 418 that the aggregation point 120 aggregates information for. Also, the processing described below in connection with FIG. 6 is implemented by each instance of the connector-assembly software 418.

In the exemplary embodiment shown FIG. 5, the aggregation software 410 is configured to use the aggregation-point TCP software 416 to repeatedly initiate the establishment of a TCP connection with the connector-assembly software 418 (block 502). TCP is used to establish the connection and, as a result, reliability features of TCP are used in connection with establishing the connection (for example, the use of acknowledgements). As a part of the TCP processing performed by the aggregation-point TCP software 416 in attempting to establish a TCP connection, the aggregation-point TCP software 416 determines if each TCP connection was successfully established (block 504). For example, if a particular TCP connection is not established within a predetermined timeout period (also referred to as the "connection timeout period"), the aggregation-point TCP software 416 considers the attempted establishment of that TCP connection to have failed. A failure to successfully establish a TCP connection with the connector-assembly software 418 indicates that the connector-assembly software 418 and the associated one or more connector assemblies 102 are not reachable at that time. If an attempt to successfully establish a TCP connection with the connector-assembly software 418 fails, the aggregation software 410 is configured to update the status of all the connector assemblies 102 associated with that instance of the connector-assembly software 418 to an "unreachable" status (block 506). The aggregation software 410 can also be configured to raise an alarm and/or take some action to confirm whether that instance of the connector-assembly software 418 is unreachable.

The aggregation-point TCP software 416 is configured to keep each TCP connection open for a first predetermined amount of time (also referred to here as the "connection period"). TCP includes various features for keeping a connection alive or open for a predetermined period of time (for example, sending of, and checking for, keepalive messages and/or using of various timers).

Also, as described below in connection with FIG. 6, the connector-assembly software 418 is configured, for each connection that is established, to send a "no event" message to the aggregation point 120 using that TCP connection if a second predetermined amount of time (also referred to here as the "monitoring period") elapses without the connector-assembly software 418 having sent any event information to the aggregation point 120 using that TCP connection. The connection period is equal to the monitoring period plus a third predetermined amount time that is at least equal to the expected amount of time for the no event message to be reliably sent to the aggregation point 120 on the TCP connection. In one exemplary implementation of such an embodiment, a connection period of 40 seconds and a monitoring period 30 seconds are used. Other connection periods and/or monitoring periods can also be used.

In the particular exemplary embodiment shown in FIGS. 5 and 6, the aggregation software 410 and the connector-assembly software 418 are both configured to note when each respective TCP connection has been "established" per the TCP protocol and start a timer (or similar timing mechanism) to determine when the connection period and the monitoring period, respectively, have elapsed for that TCP connection.

Once a TCP connection is established, the aggregation software 410 sends a request to the connector-assembly software 418 for information about the next event (block 508). In the exemplary embodiment described here in connection with FIG. 5, each instance of the connector-assembly software 418 consecutively numbers the events that occur at an associated connector assembly 102. The event information provided to the aggregation software 410 includes the event number of the event to which the event information relates. In this embodiment, the request that the aggregation software 410 sends to the connector-assembly software 418 specifies an event number. The event number specified in the request is one more than event number of the last event the aggregation software 410 has received event information for. That is, the "next" event is the event that has an event number that follows the event number of the last event the aggregation software 410 has received event information for.

This request (and the subsequent response) can be implemented using various high-layer protocols, examples of which include, without limitation, the File Transfer Protocol (FTP), the Trivial File Transfer Protocol (TFTP), the Hypertext Transfer Protocol (HTTP), the Simple Network Management Protocol (SNMP), the Representational State Transfer (REST) protocol, and the Simple Object Access Protocol (SOAP). The request is sent over the currently established TCP connection.

Generally, when the connector-assembly software 418 determines that an event has occurred at an associated connector assembly 102, the connector-assembly software 418 obtains information about that event (including PLI), buffers the event information, and, when requested to do so by the aggregation software 410, sends information about the event to the aggregation software 410 over a TCP connection. Also, as described below in connection with FIG. 6, if the current monitoring period elapses without the requested next event having occurred at an associated connector assembly 102, the connector-assembly software 418 sends a "no event" message to the aggregation software 410 using the established TCP connection. In either case, when data is received on the TCP connection from the connector-assembly software 418 (block 510), the aggregation software 410 reads the data from the TCP connection (block 512).

If the data read from the TCP connection is information about the requested next event (block 514), the aggregation software 410 uses the database manager 412 to update the database 411 with the event information received from the connector-assembly software 418 (block 516). Then, the aggregation software 410 uses the TCP protocol to reliably close the current TCP connection (block 518). As a part of the TCP protocol, each of the entities communicating over a TCP connection must independently send to the other entity a TCP CLOSE message, the receipt of which is acknowledged per the TCP protocol. A failure to successfully close a TCP connection that was established with the connector-assembly software 418 (checked in block 520) indicates to the aggregation software 410 that the connector-assembly software 418 is not reachable at that time and the aggregation software 410 is configured to update the status of all the connector assemblies 102 associated with the connector-assembly software 418 to an unreachable status (block 506). The aggregation software 410 can also be configured to raise an alarm and/or take some action to confirm whether that instance of the connector-assembly software 418 is unreachable.

If, however, the data read from the TCP connection is not event information for the requested next event and is instead a "no event" message (checked in block 514), the aggregation software 410 uses the TCP protocol to reliably close the current TCP connection as described above in connection with blocks 518-520.

After the current connection period elapses without the aggregation software 410 having received any data from the connector-assembly software 418 on the current TCP connection (checked in block 522), the aggregation software 410 considers the connector-assembly software 418 and the associated connector assemblies 102 to be unreachable at that time and the aggregation software 410 updates the status of all the connector assemblies 102 associated with the connector-assembly software 418 to an unreachable status (block 506). The aggregation software 410 can also be configured to raise an alarm and/or take some action to confirm whether that instance of the connector-assembly software 418 is unreachable. In this way, the worst-case time for the aggregation software 410 to learn that a particular instance of the connector-assembly software 418 is unreachable is bounded by the connection period.

In some implementations of such an exemplary embodiment, the event information requests sent by the aggregation software 410 are made asynchronously. That is, in such implementations, the particular thread that makes a request does not block while waiting for a response to the request from the connector-assembly software 418. Various techniques can be used to implement such an asynchronous approach including, but not limited to, using asynchronous request functionality included in TCP functionality otherwise provided in a standard application framework on which or with which the aggregation software 410 is implemented and/or implemented at the application layer as a part of the aggregation-point software 410 itself. In some other implementations of such an exemplary embodiment, the event information requests sent by the aggregation software 410 are made synchronously. That is, in such implementations, the particular thread that makes a request blocks while waiting for a response to the request from the connector-assembly software 418. In some of those implementations using synchronous requests, the aggregation software 410 is implemented as a multi-threaded application in which a separate thread is used for each instance of the connector-assembly software 418 the aggregation software 410 communicates with.

As noted above, one example of the processing performed by the connector-assembly software 418 is shown in FIG. 6.

In response to the aggregation software 410 initiating the establishment of a TCP connection (described above in connection with block 502 of FIG. 5), the connector-assembly TCP software 420 accepts the TCP connection with the aggregation software 410 (more specifically, with the aggregation-point TCP software 416) (block 602). If the TCP connection establishment process is successful, a TCP connection will exist between the aggregation-point TCP software 416 and the connector-assembly TCP software 420.

In the particular exemplary embodiment shown in FIG. 6, the connector-assembly software 418 is configured to note when each respective TCP connection has been established per the TCP protocol and start a timer (or similar timing mechanism) to determine when the respective monitoring period has elapsed for that TCP connection.

If the TCP connection is successfully established (block 604), the connector-assembly software 418 then waits for an event information request from the aggregation software 410 (block 606). As noted above, the event information request includes an event number for a "next" event that the aggregation software 410 wishes to receive information about.

The connector-assembly software 418 continually checks for the occurrence of new events at any associated connector assembly 102. When the connector-assembly software 418 determines that an event has occurred at an associated connector assembly 102, the connector-assembly software 418 obtains information (including PLI) about that event and buffers the event information.

After an event information request is received and while the TCP connection is established, if the connector-assembly software 418 determines that the next event specified in the request has occurred at an associated connector assembly 102 (block 608), the connector-assembly software 418 uses the connector-assembly TCP software 420 to reliably send information (including PLI) about that event to the aggregation software 410 over the TCP connection that is currently established (block 610). The reliability features included in the TCP protocol (for example, the sequence numbering and acknowledgment schemes) are used to help ensure that such event information is received at the aggregation point 120 in the proper order and without duplicates (and to automatically detect and respond to any cases where such event information sent from the connector-assembly software 418 is not received by the aggregation software 410). This event information is sent from the connector-assembly software 418 as a response to the request for event information sent from the aggregation point software 410 (as described above in connection with block 508) and is implemented using the same high-layer protocol that was used to send the corresponding request.

After the event information is sent to the aggregation software 410 using the current TCP connection, the connector-assembly software 418 closes the current TCP connection (block 612). As noted above, as a part of the TCP protocol, each of the entities communicating over a TCP connection must independently send to the other entity a TCP CLOSE message, the receipt of which is acknowledged per the TCP protocol.

Also, as noted above, the connector-assembly software 418 buffers the event information it captures. So, in the event that the event information sent from the connector-assembly software 418 is not successfully received at the aggregation software 410, the aggregation software 410 can re-request information for that event and the connector-assembly software 418 can re-send the event information for that event when a new TCP connection is established between the connector-assembly software 418 and the aggregation software 410.

If the current monitoring period elapses without the next event specified in the request having occurred at an associated connector assembly 102 (block 614), the connector-assembly software 418 uses the connector-assembly TCP software 420 to reliably send a "no event" message to the aggregation software 410 over the current TCP connection (block 616). Then, the connector-assembly software 418 closes the current TCP connection as described above in connection block 612.

Although FIG. 6 was described in connection with a connector assembly 102, it is to be understood that the processing associated with FIG. 6 can be implemented by other types of devices that communicate information (including PLI) to an aggregation point 120. Examples of such other devices include, without limitation, end-user devices—such as computers, peripherals (for example, printers, copiers, storage devices, and scanners), and IP telephones—that include functionality for automatically reading information stored in or on the segment of physical communication media.

Further details, embodiments, and implementations can be found in the following United States Patent Applications, all of which are hereby incorporated herein by reference: U.S. Provisional Patent Application Ser. No. 61/252,964, filed on Oct. 19, 2009, titled "ELECTRICAL PLUG FOR MANAGED CONNECTIVITY"; U.S. Provisional Patent Application Ser. No. 61/253,208, filed on Oct. 20, 2009, titled "ELECTRICAL PLUG FOR MANAGED CONNECTIVITY"; U.S. patent application Ser. No. 12/907,724, filed on Oct. 19, 2010, titled "MANAGED ELECTRICAL CONNECTIVITY SYSTEMS"; U.S. Provisional Patent Application Ser. No. 61/303,948, filed on Feb. 12, 2010, titled "PANEL INCLUDING BLADE FEATURE FOR MANAGED CONNECTIVITY"; U.S. Provisional Patent Application Ser. No. 61/413,844, filed on Nov. 15, 2010, titled "COMMUNICATIONS BLADED PANEL SYSTEMS"; U.S. Provisional Patent Application Ser. No. 61/439,693, filed on Feb. 4, 2011, titled "COMMUNICATIONS BLADED PANEL SYSTEMS"; U.S. patent application Ser. No. 13/025,730, filed on Feb. 11, 2011, titled "COMMUNICATIONS BLADED PANEL SYSTEMS"; U.S. patent application Ser. No. 13/025,737, filed on Feb. 11, 2011, titled "COMMUNICATIONS BLADED PANEL SYSTEMS"; U.S. patent application Ser. No. 13/025,743, filed on Feb. 11, 2011, titled "COMMUNICATIONS BLADED PANEL SYSTEMS"; U.S. patent application Ser. No. 13/025,750, filed on Feb. 11, 2011, titled "COMMUNICATIONS BLADED PANEL SYSTEMS"; U.S. Provisional Patent Application Ser. No. 61/303,961; filed on Feb. 12, 2010, titled "Fiber Plug And Adapter For Managed Connectivity"; U.S. Provisional Patent Application Ser. No. 61/413,828, filed on Nov. 15, 2010, titled "Fiber Plugs And Adapters For Managed Connectivity"; U.S. Provisional Patent Application Ser. No. 61/437,504, filed on Jan. 28, 2011, titled "Fiber Plugs And Adapters For Managed Connectivity"; U.S. patent application Ser. No. 13/025,784, filed on Feb. 11, 2011, titled "Managed Fiber Connectivity Systems"; U.S. patent application Ser. No. 13/025,788, filed on Feb. 11, 2011, titled "Managed Fiber Connectivity Systems"; U.S. patent application Ser. No. 13/025,797, filed on Feb. 11, 2011, titled "Managed Fiber Connectivity Systems"; U.S. patent application Ser. No. 13/025,841, filed on Feb. 11, 2011, titled "Managed Fiber Connectivity Systems"; U.S. Provisional Patent Application Ser. No. 61/413,856, filed on Nov. 15, 2010, titled "CABLE MANAGEMENT IN RACK SYSTEMS"; U.S. Provisional Patent Application Ser. No. 61/466,696, filed on Mar. 23, 2011, titled "CABLE MANAGEMENT IN RACK SYSTEMS"; U.S. Provisional Patent Application Ser. No. 61/252,395, filed on Oct. 16, 2009, titled "MANAGED CONNECTIVITY IN ELECTRICAL SYSTEMS"; U.S. patent application Ser. No. 12/905,689, filed on Oct. 15, 2010, titled "MANAGED CONNECTIVITY IN ELECTRICAL SYSTEMS"; U.S. Provisional Patent Application Ser. No. 61/252,386, filed on Oct. 16, 2009, titled "MANAGED CONNECTIVITY IN FIBER OPTIC SYSTEMS"; and U.S. patent application Ser. No. 12/905,658, filed on Oct. 15, 2010, titled "MANAGED CONNECTIVITY IN FIBER OPTIC SYSTEMS".

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of reporting information about events occurring at a device having at least one attachment point at which at least one segment of physical communication media can be attached to the device, wherein the device is configured to read information stored on or in the segment of physical communication media that is attached to the device, the method comprising:

establishing a connection between a first entity and a second entity associated with the device, wherein the connection is established using a reliable packet-based communication protocol;

if an event associated with the device that is unrelated to the connection occurs, reliably sending event information from the second entity to the first entity on the connection using the reliable packet-based communication protocol; and if a predetermined amount of time elapses since establishing the connection without an event associated with the device that is unrelated to the connection occurring, reliably sending a first message from the second entity to the first entity on the connection using the reliable packet-based communication protocol, the first message indicating that no event associated with the device that is unrelated to the connection has occurred during the predetermined amount of time, and closing the connection after the first message has been sent on the connection;

wherein the first entity comprises software executing on an aggregation point, wherein the aggregation point is communicatively coupled to the device; and wherein the device comprises a connector assembly.

2. The method of claim 1, further comprising, if the event associated with the device that is unrelated to the connection occurs and the event information was not successfully sent from the second entity to the first entity on the connection using the reliable packet-based communication protocol, buffering the event information.

3. The method of claim 1, further comprising, if the connection is successfully established, receiving a request for information related to any events associated with the device sent from the second entity.

4. The method of claim 1, wherein the method is repeatedly performed for successive connections, where each connection is closed after event information or a no event message has been received on the respective connection.

5. A device comprising:
a programmable processor configured to execute software;
an interface to communicatively couple the device to an aggregation point; and
at least one attachment point at which at least one segment of physical communication media can be attached to the device, wherein the device is configured to read information stored on or in the segment of physical communication media that is attached to the device;
wherein the software is configured to cause the programmable processor to:
establish a connection between an aggregation point and the device, wherein the connection is established using a reliable packet-based communication protocol;
if an event associated with the device that is unrelated to the connection occurs, reliably send event information from the device to the aggregation point on the connection using the reliable packet-based communication protocol; and
if a predetermined amount of time elapses since establishing the connection without an event associated with the device that is unrelated to the connection occurring, reliably send a first message from the device to the aggregation point on the connection using the reliable packet-based communication protocol, the first message indicating that no event associated with the device that is unrelated to the connection has occurred during the predetermined amount of time, and close the connection after sending the first message on the connection; and
wherein the device comprises a connector assembly.

\* \* \* \* \*